(12) United States Patent
Murphey et al.

(10) Patent No.: US 10,110,663 B2
(45) Date of Patent: *Oct. 23, 2018

(54) METHOD AND SYSTEM FOR PUBLISHING VIRTUAL APPLICATIONS TO A WEB SERVER

(71) Applicant: Code Systems Corporation, Seattle, WA (US)

(72) Inventors: C. Michael Murphey, Seattle, WA (US); Kenji C. Obata, Seattle, WA (US); Mark Jeremy Zeller, Seattle, WA (US)

(73) Assignee: CODE SYSTEMS CORPORATION, Seattle, WA (US)

(*) Notice: Subject to any disclaimer, the term of this patent is extended or adjusted under 35 U.S.C. 154(b) by 38 days.

This patent is subject to a terminal disclaimer.

(21) Appl. No.: 14/609,895

(22) Filed: Jan. 30, 2015

(65) Prior Publication Data
US 2015/0149537 A1 May 28, 2015

Related U.S. Application Data

(63) Continuation of application No. 12/906,904, filed on Oct. 18, 2010, now Pat. No. 9,021,015.

(51) Int. Cl.
*G06F 15/16* (2006.01)
*H04L 29/08* (2006.01)
(Continued)

(52) U.S. Cl.
CPC ........... *H04L 67/10* (2013.01); *G06F 8/63* (2013.01); *G06F 8/71* (2013.01); *H04L 67/06* (2013.01);
(Continued)

(58) Field of Classification Search
CPC .................................................. G06F 8/71
(Continued)

(56) References Cited

U.S. PATENT DOCUMENTS

| 4,468,732 A | 8/1984 | Raver |
| 5,437,031 A | 7/1995 | Kitami |

(Continued)

OTHER PUBLICATIONS

Non-Final Office Action, 20 pages, received in U.S. Appl. No. 12/188,155, dated Dec. 19, 2011.
(Continued)

*Primary Examiner* — Aftab N. Khan
(74) *Attorney, Agent, or Firm* — Davis Wright Tremaine LLP; Heather M. Colburn

(57) ABSTRACT

A method and system for publishing virtual applications on the Internet. The method includes obtaining a list of applications associated with a publisher from a server computing device and displaying the list to a user via a user interface. Next, a selection by the user of one of the applications is received from the user interface. A new virtualized version of the selected application is built. The virtualized version includes at least one application file that at least partially implements the new virtualized version of the selected application. Then, the application file is uploaded to the server computing device. An application address is received from the server computing device and a link to the application address is displayed to the user via the user interface. The virtualized version of the application is available at the application address for download and execution over a network (e.g., the Internet).

23 Claims, 9 Drawing Sheets

(51) Int. Cl.
  *G06F 8/71* (2018.01)
  *G06F 8/61* (2018.01)
  *H04L 29/06* (2006.01)
  *G06F 8/70* (2018.01)
  *G06F 9/455* (2018.01)

(52) U.S. Cl.
  CPC ............... *H04L 67/42* (2013.01); *G06F 8/70* (2013.01); *G06F 9/45533* (2013.01); *H04L 29/0809* (2013.01)

(58) Field of Classification Search
  USPC .................................... 709/201, 202, 203
  See application file for complete search history.

(56) References Cited

U.S. PATENT DOCUMENTS

| | | |
|---|---|---|
| 5,495,610 A | 2/1996 | Shing et al. |
| 5,774,713 A | 6/1998 | Yokota |
| 5,860,068 A | 1/1999 | Cook |
| 5,987,590 A | 11/1999 | Wing So |
| 6,023,712 A | 2/2000 | Spear et al. |
| 6,192,375 B1 | 2/2001 | Gross |
| 6,263,363 B1 | 7/2001 | Rosenblatt et al. |
| 6,345,212 B1 | 2/2002 | Nourse |
| 6,366,947 B1 | 4/2002 | Kavner |
| 6,453,334 B1 | 9/2002 | Vinson et al. |
| 6,493,733 B1 | 12/2002 | Pollack et al. |
| 6,564,229 B1 | 5/2003 | Baweja et al. |
| 6,675,216 B1 | 1/2004 | Quatrano et al. |
| 6,704,808 B2 | 3/2004 | Kasamatsu et al. |
| 6,757,893 B1 | 6/2004 | Haikin |
| 7,028,295 B2 | 4/2006 | Li et al. |
| 7,064,760 B2 | 6/2006 | Capin et al. |
| 7,065,504 B2 | 6/2006 | Sakuma et al. |
| 7,076,768 B2 | 7/2006 | Li et al. |
| 7,089,259 B1 | 8/2006 | Kouznetsov et al. |
| 7,096,253 B2 | 8/2006 | Vinson et al. |
| 7,096,416 B1 | 8/2006 | Smith et al. |
| 7,117,495 B2 | 10/2006 | Blaser et al. |
| 7,130,073 B2 | 10/2006 | Kumar et al. |
| 7,162,036 B2 | 1/2007 | Rowe |
| 7,240,162 B2 | 7/2007 | De Vries |
| 7,246,351 B2 | 7/2007 | Bloch et al. |
| 7,272,613 B2 | 9/2007 | Sim et al. |
| 7,275,243 B2 | 9/2007 | Gibbons et al. |
| 7,337,298 B2 | 2/2008 | Kawachiya et al. |
| 7,356,679 B1 | 4/2008 | Le et al. |
| 7,360,097 B2 | 4/2008 | Rothstein |
| 7,386,542 B2 | 6/2008 | Maybury et al. |
| 7,386,546 B1 | 6/2008 | Santry et al. |
| 7,437,371 B2 | 10/2008 | Rathakrishnan et al. |
| 7,451,176 B2 | 11/2008 | Anders et al. |
| 7,451,196 B1 | 11/2008 | de Vries et al. |
| 7,490,072 B1 | 2/2009 | Cowan et al. |
| 7,496,931 B2 | 2/2009 | Cook et al. |
| 7,499,991 B2 | 3/2009 | Johnson |
| 7,519,959 B1 | 4/2009 | Dmitriev |
| 7,523,116 B2 | 4/2009 | Yan |
| 7,529,784 B2 | 5/2009 | Kavuri et al. |
| 7,536,505 B2 | 5/2009 | Takakuwa |
| 7,536,541 B2 | 5/2009 | Isaacson |
| 7,577,751 B2 | 8/2009 | Vinson et al. |
| 7,584,342 B1 | 9/2009 | Nordquist et al. |
| 7,590,644 B2 | 9/2009 | Matsakis et al. |
| 7,600,097 B1 | 10/2009 | Wright |
| 7,607,127 B2 | 10/2009 | Romm et al. |
| 7,623,673 B2 | 11/2009 | Mercier |
| 7,634,477 B2 | 12/2009 | Hinshaw |
| 7,634,772 B2 | 12/2009 | Parthasarathy et al. |
| 7,664,367 B2 | 2/2010 | Suzuki |
| 7,669,189 B1 | 2/2010 | Umamageswaran |
| 7,689,825 B2 | 3/2010 | Iwamura |
| 7,707,564 B2 | 4/2010 | Marvin et al. |
| 7,743,407 B2 | 6/2010 | Sprigg et al. |
| 7,752,442 B2 | 7/2010 | Della-Libera et al. |
| 7,752,511 B2 | 7/2010 | Fulton et al. |
| 7,761,503 B2 | 7/2010 | Dhawan et al. |
| 7,797,748 B2 | 9/2010 | Zheng et al. |
| 7,801,827 B2 | 9/2010 | Bishop et al. |
| 7,831,047 B2 | 11/2010 | Rowe |
| 7,836,299 B2 | 11/2010 | England et al. |
| 7,840,961 B1 | 11/2010 | Weathersby |
| 7,950,026 B1 | 5/2011 | Urbach |
| 7,958,497 B1 | 6/2011 | Lindo et al. |
| 7,970,789 B1 | 6/2011 | Blaser et al. |
| 7,971,032 B2 | 6/2011 | Shattuck |
| 7,984,043 B1 | 7/2011 | Waas |
| 8,010,667 B2 | 8/2011 | Zhang et al. |
| 8,065,675 B2 | 11/2011 | Strauss et al. |
| 8,069,443 B2 | 11/2011 | Ackerman et al. |
| 8,073,926 B2 | 12/2011 | Traut et al. |
| 8,180,884 B1 | 5/2012 | Hall |
| 8,219,805 B1 | 7/2012 | Ie et al. |
| 8,230,414 B1 | 7/2012 | Hand et al. |
| 8,230,442 B2 | 7/2012 | Aho et al. |
| 8,271,944 B2 | 9/2012 | Austin et al. |
| 8,347,208 B2 | 1/2013 | Howell |
| 8,356,266 B1 | 1/2013 | Ou et al. |
| 8,375,140 B2 | 2/2013 | Tippin et al. |
| 8,387,006 B1 | 2/2013 | Taylor |
| 8,429,248 B1 | 4/2013 | Ketrenos et al. |
| 8,434,093 B2 | 4/2013 | Larimore et al. |
| 8,453,049 B1 | 5/2013 | Grieve |
| 8,468,175 B2 | 6/2013 | Obata |
| 8,489,513 B2 | 7/2013 | Bishop et al. |
| 8,510,734 B2 | 8/2013 | Criddle et al. |
| 8,626,806 B2 | 1/2014 | Larimore et al. |
| 8,645,488 B2 | 2/2014 | Ivory et al. |
| 8,677,345 B2 | 3/2014 | Choi et al. |
| 8,719,898 B1 | 5/2014 | Barton et al. |
| 8,745,601 B1 | 6/2014 | Carlson et al. |
| 8,762,951 B1 | 6/2014 | Kosche et al. |
| 8,762,986 B2 | 6/2014 | Gebhart |
| 8,763,009 B2 | 6/2014 | Degirmenci et al. |
| 8,806,325 B2 | 8/2014 | Decker |
| 8,978,012 B1 | 3/2015 | Poole |
| 8,990,289 B2 | 3/2015 | Mott |
| 9,003,541 B1 | 4/2015 | Patidar |
| 9,098,706 B1 | 8/2015 | Kennedy |
| 9,158,845 B1 | 10/2015 | Reddy |
| 9,208,169 B2 | 12/2015 | Obata |
| 9,229,748 B2 | 1/2016 | Larimore et al. |
| 9,268,542 B1 | 2/2016 | Mars et al. |
| 9,569,286 B2 | 2/2017 | Larimore et al. |
| 2001/0016905 A1 | 8/2001 | Kasamatsu et al. |
| 2002/0029283 A1 | 3/2002 | Beckett et al. |
| 2002/0032754 A1 | 3/2002 | Logston et al. |
| 2002/0066085 A1 | 5/2002 | Nowlin, Jr. et al. |
| 2002/0099951 A1 | 7/2002 | O'Connor |
| 2002/0112078 A1 | 8/2002 | Yach |
| 2002/0129129 A1 | 9/2002 | Bloch et al. |
| 2002/0133491 A1 | 9/2002 | Sim et al. |
| 2002/0138441 A1 | 9/2002 | Lopatic |
| 2002/0161578 A1 | 10/2002 | Saidon et al. |
| 2002/0162015 A1 | 10/2002 | Tang |
| 2002/0174193 A1 | 11/2002 | Mikhalchuk |
| 2003/0005118 A1 | 1/2003 | Williams |
| 2003/0031176 A1 | 2/2003 | Sim et al. |
| 2003/0051169 A1 | 3/2003 | Sprigg et al. |
| 2004/0003390 A1 | 1/2004 | Canter |
| 2004/0015747 A1 | 1/2004 | Dwyer |
| 2004/0044645 A1 | 3/2004 | Palumbo |
| 2004/0083474 A1 | 4/2004 | McKinlay et al. |
| 2004/0111671 A1 | 6/2004 | Lu |
| 2004/0128342 A1 | 7/2004 | Maes et al. |
| 2004/0133444 A1 | 7/2004 | Defaix et al. |
| 2004/0139315 A1 | 7/2004 | Tokutani et al. |
| 2004/0236772 A1 | 11/2004 | Arakawa |
| 2004/0237082 A1 | 11/2004 | Alcazar |
| 2004/0255293 A1 | 12/2004 | Spotswood |
| 2005/0010932 A1 | 1/2005 | Kohno et al. |
| 2005/0132359 A1 | 6/2005 | McGuire et al. |
| 2005/0198628 A1 | 9/2005 | Graham et al. |

(56) References Cited

U.S. PATENT DOCUMENTS

| | | |
|---|---|---|
| 2005/0198647 A1 | 9/2005 | Hipp et al. |
| 2005/0235282 A1 | 10/2005 | Anderson |
| 2005/0262553 A1 | 11/2005 | Bialick et al. |
| 2005/0273772 A1 | 12/2005 | Matsakis et al. |
| 2005/0283673 A1 | 12/2005 | Ode |
| 2005/0289546 A1 | 12/2005 | Shpeisman et al. |
| 2006/0048136 A1 | 3/2006 | Vries et al. |
| 2006/0053380 A1 | 3/2006 | Spataro et al. |
| 2006/0074733 A1 | 4/2006 | Shukla et al. |
| 2006/0075064 A1 | 4/2006 | Keohane et al. |
| 2006/0085359 A1 | 4/2006 | Kim |
| 2006/0117325 A1 | 6/2006 | Wieland et al. |
| 2006/0123185 A1 | 6/2006 | de Vries et al. |
| 2006/0143135 A1 | 6/2006 | Tucker |
| 2006/0168294 A1 | 7/2006 | de Vries et al. |
| 2006/0218165 A1 | 9/2006 | Vries et al. |
| 2006/0222203 A1 | 10/2006 | Mercier |
| 2006/0230175 A1 | 10/2006 | de Vries et al. |
| 2006/0242626 A1 | 10/2006 | Pham et al. |
| 2006/0248442 A1 | 11/2006 | Rosenstein et al. |
| 2006/0253535 A1 | 11/2006 | Betros et al. |
| 2006/0256130 A1 | 11/2006 | Gonzalez |
| 2006/0259585 A1 | 11/2006 | Keohane et al. |
| 2006/0271596 A1 | 11/2006 | Sabsevitz et al. |
| 2007/0011672 A1 | 1/2007 | Bhide et al. |
| 2007/0016721 A1 | 1/2007 | Gay |
| 2007/0043943 A1 | 2/2007 | Peretti |
| 2007/0074191 A1 | 3/2007 | Geisinger |
| 2007/0078988 A1 | 4/2007 | Miloushev et al. |
| 2007/0083482 A1 | 4/2007 | Rathi et al. |
| 2007/0143672 A1 | 6/2007 | Lipton |
| 2007/0143704 A1 | 6/2007 | Laird-McConnell |
| 2007/0168953 A1 | 7/2007 | Diez et al. |
| 2007/0168965 A1 | 7/2007 | Zenz et al. |
| 2007/0174824 A1 | 7/2007 | Relyea et al. |
| 2007/0192329 A1 | 8/2007 | Croft et al. |
| 2007/0198780 A1 | 8/2007 | Boyd et al. |
| 2007/0226798 A1 | 9/2007 | Sibert |
| 2007/0234277 A1 | 10/2007 | Lei et al. |
| 2007/0240155 A1 | 10/2007 | Shlomai |
| 2007/0245331 A1 | 10/2007 | Daynes et al. |
| 2007/0277102 A1 | 11/2007 | Kanzaki |
| 2007/0283324 A1 | 12/2007 | Geisinger |
| 2007/0294373 A1 | 12/2007 | Harrison |
| 2007/0294674 A1 | 12/2007 | Marilly et al. |
| 2008/0010389 A1 | 1/2008 | Iwata |
| 2008/0016397 A1 | 1/2008 | Pagan |
| 2008/0034268 A1 | 2/2008 | Dodd et al. |
| 2008/0034364 A1 | 2/2008 | Lam et al. |
| 2008/0091739 A1 | 4/2008 | Bone et al. |
| 2008/0092057 A1 | 4/2008 | Monson et al. |
| 2008/0109876 A1 | 5/2008 | Hitomi et al. |
| 2008/0126785 A1 | 5/2008 | Chong et al. |
| 2008/0155171 A1 | 6/2008 | Jeong |
| 2008/0154985 A1 | 7/2008 | Childs et al. |
| 2008/0163194 A1 | 7/2008 | Dias et al. |
| 2008/0181230 A1 | 7/2008 | Hitt et al. |
| 2008/0184135 A1 | 7/2008 | Washburn et al. |
| 2008/0184211 A1 | 7/2008 | Nickolls et al. |
| 2008/0201705 A1 | 8/2008 | Wookey |
| 2008/0215722 A1 | 9/2008 | Hogaboom et al. |
| 2008/0228770 A1 | 9/2008 | Halcrow et al. |
| 2008/0235680 A1 | 9/2008 | Strauss |
| 2008/0275938 A1 | 11/2008 | Yach |
| 2008/0281882 A1 | 11/2008 | Hachio et al. |
| 2008/0294877 A1 | 11/2008 | Haga et al. |
| 2008/0298219 A1 | 12/2008 | Yamagata et al. |
| 2008/0301672 A1 | 12/2008 | Rao et al. |
| 2009/0037287 A1 | 2/2009 | Baitalmal et al. |
| 2009/0055542 A1 | 2/2009 | Zhao et al. |
| 2009/0064086 A1 | 3/2009 | Faus et al. |
| 2009/0076898 A1 | 3/2009 | Wang et al. |
| 2009/0076966 A1 | 3/2009 | Bishop et al. |
| 2009/0077551 A1 | 3/2009 | Whiteley |
| 2009/0077645 A1 | 3/2009 | Kottahachchi |
| 2009/0110307 A1 | 4/2009 | Markowitz |
| 2009/0125907 A1 | 5/2009 | Wen et al. |
| 2009/0132811 A1 | 5/2009 | Koster et al. |
| 2009/0133013 A1 | 5/2009 | Criddle et al. |
| 2009/0158432 A1 | 6/2009 | Zheng et al. |
| 2009/0164570 A1 | 6/2009 | Paila |
| 2009/0172664 A1 | 7/2009 | Mostafa |
| 2009/0180475 A1 | 7/2009 | Hashimoto |
| 2009/0193057 A1 | 7/2009 | Maes |
| 2009/0198358 A1 | 8/2009 | Logan et al. |
| 2009/0199175 A1 | 8/2009 | Keller et al. |
| 2009/0216811 A1 | 8/2009 | Manczak et al. |
| 2009/0235158 A1 | 9/2009 | Rosenstein et al. |
| 2009/0240663 A1 | 9/2009 | Plattner et al. |
| 2009/0248695 A1 | 10/2009 | Ozzie |
| 2009/0248861 A1 | 10/2009 | Kato |
| 2009/0249071 A1 | 10/2009 | De Atley et al. |
| 2009/0249324 A1 | 10/2009 | Brar et al. |
| 2009/0300076 A1 | 12/2009 | Friedman et al. |
| 2009/0300151 A1 | 12/2009 | Friedman et al. |
| 2009/0307351 A1 | 12/2009 | Raja et al. |
| 2009/0307763 A1 | 12/2009 | Rawlins et al. |
| 2009/0313322 A1 | 12/2009 | Sheehan et al. |
| 2009/0328030 A1 | 12/2009 | Fries |
| 2010/0005291 A1 | 1/2010 | Hulten et al. |
| 2010/0023640 A1 | 1/2010 | Vinson et al. |
| 2010/0023726 A1 | 1/2010 | Aviles |
| 2010/0023934 A1 | 1/2010 | Sheehan et al. |
| 2010/0023974 A1 | 1/2010 | Shiragaki et al. |
| 2010/0037206 A1 | 2/2010 | Larimore et al. |
| 2010/0037216 A1 | 2/2010 | Carcerano et al. |
| 2010/0037235 A1 | 2/2010 | Larimore et al. |
| 2010/0064295 A1 | 3/2010 | Aho et al. |
| 2010/0077096 A1 | 3/2010 | Philip et al. |
| 2010/0082926 A1 | 4/2010 | Sahita et al. |
| 2010/0088448 A1 | 4/2010 | Min et al. |
| 2010/0106804 A1 | 4/2010 | He et al. |
| 2010/0107163 A1 | 4/2010 | Lee |
| 2010/0121973 A1 | 5/2010 | Lobacheva et al. |
| 2010/0122120 A1 | 5/2010 | Lin |
| 2010/0131084 A1 | 5/2010 | Van Camp |
| 2010/0132009 A1 | 5/2010 | Khemani et al. |
| 2010/0138479 A1 | 6/2010 | Zhu |
| 2010/0146220 A1 | 6/2010 | Panchenko et al. |
| 2010/0146590 A1 | 6/2010 | Jung |
| 2010/0169790 A1 | 7/2010 | Vaughan et al. |
| 2010/0205604 A1 | 8/2010 | Brower et al. |
| 2010/0223598 A1 | 9/2010 | Levine |
| 2010/0235831 A1 | 9/2010 | Dittmer |
| 2010/0241718 A1 | 9/2010 | Rasmussen et al. |
| 2010/0250782 A1 | 9/2010 | Pratt et al. |
| 2010/0281458 A1 | 11/2010 | Paladino et al. |
| 2010/0306849 A1 | 12/2010 | Zheng et al. |
| 2010/0318997 A1 | 12/2010 | Li et al. |
| 2010/0322523 A1 | 12/2010 | Mitsuhashi et al. |
| 2010/0333085 A1 | 12/2010 | Criddle et al. |
| 2011/0004840 A1 | 1/2011 | Feinberg et al. |
| 2011/0022940 A1 | 1/2011 | King et al. |
| 2011/0022947 A1 | 1/2011 | Rajkumar |
| 2011/0029641 A1 | 2/2011 | Fainberg |
| 2011/0078625 A1 | 3/2011 | Mumford et al. |
| 2011/0106908 A1 | 5/2011 | Risku et al. |
| 2011/0145428 A1 | 6/2011 | Wei et al. |
| 2011/0145592 A1 | 6/2011 | Greiner |
| 2011/0145726 A1 | 6/2011 | Wei et al. |
| 2011/0153437 A1 | 6/2011 | Archer et al. |
| 2011/0153975 A1 | 6/2011 | Accapadi et al. |
| 2011/0154213 A1 | 6/2011 | Wheatley |
| 2011/0173251 A1 | 7/2011 | Sandhu et al. |
| 2011/0179411 A1 | 7/2011 | Lederer |
| 2011/0185013 A1 | 7/2011 | Obata et al. |
| 2011/0185043 A1 | 7/2011 | Zeller et al. |
| 2011/0191772 A1 | 8/2011 | Larimore et al. |
| 2011/0225584 A1 | 9/2011 | Andrade et al. |
| 2011/0225592 A1 | 9/2011 | Goldin |
| 2011/0246659 A1 | 10/2011 | Bouazizi |
| 2011/0246763 A1 | 10/2011 | Karnes |
| 2011/0265078 A1 | 10/2011 | Beatty et al. |
| 2011/0289513 A1 | 11/2011 | Degirmenci et al. |

(56) References Cited

U.S. PATENT DOCUMENTS

| | | |
|---|---|---|
| 2011/0302274 A1 | 12/2011 | Lee et al. |
| 2012/0005237 A1 | 1/2012 | Obata |
| 2012/0005244 A1 | 1/2012 | Obata et al. |
| 2012/0005246 A1 | 1/2012 | Obata |
| 2012/0005309 A1 | 1/2012 | Obata et al. |
| 2012/0005310 A1 | 1/2012 | Obata |
| 2012/0005334 A1 | 1/2012 | Raja et al. |
| 2012/0005674 A1 | 1/2012 | Larimore et al. |
| 2012/0054744 A1 | 3/2012 | Singh et al. |
| 2012/0090021 A1 | 4/2012 | Luh et al. |
| 2012/0096071 A1 | 4/2012 | Murphey et al. |
| 2012/0110337 A1 | 5/2012 | Murphey et al. |
| 2012/0125993 A1 | 5/2012 | Thiele et al. |
| 2012/0150986 A1 | 6/2012 | Piccinini et al. |
| 2012/0155358 A1 | 6/2012 | Hao et al. |
| 2012/0203807 A1 | 8/2012 | Larimore et al. |
| 2012/0203808 A1 | 8/2012 | Larimore et al. |
| 2013/0086386 A1 | 4/2013 | Murphey et al. |
| 2013/0104208 A1 | 4/2013 | Kumar et al. |
| 2013/0104219 A1 | 4/2013 | Kumar et al. |
| 2013/0117567 A1 | 5/2013 | Chang et al. |
| 2013/0132525 A1 | 5/2013 | Tippin |
| 2013/0139250 A1 | 5/2013 | Lo et al. |
| 2013/0191882 A1 | 7/2013 | Jolfaei |
| 2013/0247070 A1 | 9/2013 | Larimore et al. |
| 2013/0254848 A1 | 9/2013 | Ge |
| 2013/0271456 A1 | 10/2013 | Haswell et al. |
| 2013/0275886 A1 | 10/2013 | Haswell et al. |
| 2013/0283362 A1 | 10/2013 | Kress et al. |
| 2014/0298401 A1 | 10/2014 | Batson et al. |

OTHER PUBLICATIONS

Final Office Action, 22 pages, received in U.S. Appl. No. 12/188,155, dated Aug. 31, 2012.
Non-Final Office Action, 22 pages, received in U.S. Appl. No. 12/188,155, dated Feb. 28, 2013.
Notice of Allowance, 11 pages, received in U.S. Appl. No. 12/188,155, dated Jun. 25, 2013.
Notice of Allowance, received in U.S. Appl. No. 12/188,155, dated Oct. 25, 2013.
Notice of Allowance, received in U.S. Appl. No. 12/188,155, dated Feb. 13, 2014.
Restriction Requirement, received in U.S. Appl. No. 12/188,161, dated Dec. 20, 2011.
Non-Final Office Action, 14 pages, received in U.S. Appl. No. 12/188,161, dated May 10, 2012.
Notice of Allowance, 13 pages, received in U.S. Appl. No. 12/188,161, dated Oct. 10, 2012.
Notice of Allowance, 12 pages, received in U.S. Appl. No. 12/188,161, dated Dec. 4, 2012.
Notice of Allowance, 13 pages, received in U.S. Appl. No. 12/188,161, dated Jan. 4, 2013.
Non-Final Office Action, 8 pages, received in U.S. Appl. No. 12/685,576, dated Nov. 2, 2012.
Non-Final Office Action, 8 pages, received in U.S. Appl. No. 12/685,576, dated Jun. 20, 2013.
Final Office Action, received in U.S. Appl. No. 12/685,576, dated Jan. 30, 2014.
Notice of Allowance, received in U.S. Appl. No. 12/685,576, dated Sep. 23, 2014.
Non-Final Office Action, 17 pages, received in U.S. Appl. No. 12/695,107, dated Dec. 8, 2011.
Final Office Action, 16 pages, received in U.S. Appl. No. 12/695,107, dated Oct. 30, 2012.
Notice of Allowance, received in U.S. Appl. No. 12/695,107, dated Sep. 17, 2014.
Notice of Allowance, received in U.S. Appl. No. 12/695,107, dated Jan. 5, 2015.
Notice of Allowance, received in U.S. Appl. No. 12/695,107, dated Mar. 19, 2015.
Notice of Allowance, 21 pages, received in U.S. Appl. No. 12/697,029, dated Aug. 17, 2012.
Notice of Allowance, 26 pages, received in U.S. Appl. No. 12/697,029, dated May 24, 2013.
Notice of Allowance, received in U.S. Appl. No. 12/697,029, dated Oct. 3, 2014.
Notice of Allowance, received in U.S. Appl. No. 12/697,029, dated Jan. 30, 2015.
Restriction Requirement, 5 pages, received in U.S. Appl. No. 12/705,492, dated Mar. 15, 2013.
Restriction Requirement, received in U.S. Appl. No. 12/705,492, dated Aug. 6, 2014.
Notice of Allowance, received in U.S. Appl. No. 12/705,492, dated Sep. 26, 2014.
Notice of Allowance, received in U.S. Appl. No. 12/705,492, dated Oct. 31, 2014.
Non-Final Office Action, 18 pages, received in U.S. Appl. No. 12/876,082, dated Oct. 22, 2012.
Notice of Allowance, 26 pages, received in U.S. Appl. No. 12/876,082, dated May 10, 2013.
Notice of Allowance, received in U.S. Appl. No. 12/876,082, dated Feb. 28, 2014.
Notice of Allowance, received in U.S. Appl. No. 12/876,082, dated Sep. 26, 2014.
Notice of Allowance, received in U.S. Appl. No. 12/876,082, dated Feb. 20, 2015.
Restriction Requirement, received in U.S. Appl. No. 12/876,085, dated Jan. 27, 2012.
Non-Final Office Action, 9 pages, received in U.S. Appl. No. 12/876,085, dated Mar. 8, 2012.
Final Office Action, 12 pages, received in U.S. Appl. No. 12/876,085, dated Nov. 14, 2012.
Non-Final Office Action, 13 pages, received in U.S. Appl. No. 12/876,085, dated Mar. 18, 2013.
Notice of Allowance, received in U.S. Appl. No. 12/876,085, dated Nov. 14, 2013.
Notice of Allowance, received in U.S. Appl. No. 12/876,085, dated Mar. 6, 2014.
Notice of Allowance, 25 pages, received in U.S. Appl. No. 12/877,918, dated Mar. 19, 2012.
Notice of Allowance, 31 pages, received in U.S. Appl. No. 12/877,918, dated Jun. 21, 2012.
Notice of Allowance, 22 pages, received in U.S. Appl. No. 12/877,918, dated Aug. 16, 2012.
Notice of Allowance, 24 pages, received in U.S. Appl. No. 12/877,918, dated Sep. 26, 2012.
Notice of Allowance, 35 pages, received in U.S. Appl. No. 12/877,918, dated Apr. 26, 2013.
Notice of Allowance, received in U.S. Appl. No. 12/877,918, dated Aug. 20, 2013.
Notice of Allowance, received in U.S. Appl. No. 12/877,918, dated Dec. 13, 2013.
Non Final Office Action, 22 pages, received in U.S. Appl. No. 12/879,947, dated Jul. 10, 2013.
Notice of Allowance, received in U.S. Appl. No. 12/879,947, dated Jan. 27, 2014.
Non-Final Office Action, 11 pages, received in U.S. Appl. No. 12/879,956, dated Jun. 6, 2012.
Notice of Allowance, 17 pages, received in U.S. Appl. No. 12/879,956, dated Feb. 21, 2013.
Final Office Action, 11 pages, received in U.S. Appl. No. 12/879,956, dated Nov. 23, 2012.
Non-Final Office Action, 19 pages, received in U.S. Appl. No. 12/906,904, dated Nov. 13, 2012.
Final Rejection, received in U.S. Appl. No. 12/906,904, dated Jul. 31, 2013.
Notice of Allowance, received in U.S. Appl. No. 12/906,904, dated Oct. 8, 2014.
Non-Final Office Action, 24 pages, received in U.S. Appl. No. 12/916,348, dated Oct. 24, 2012.
Final Office Action, 26 pages, received in U.S. Appl. No. 12/916,348, dated Jul. 11, 2013.

(56) References Cited

OTHER PUBLICATIONS

Notice of Allowance, received in U.S. Appl. No. 12/916,348, dated Nov. 13, 2013.
Non-Final Office Action, received in U.S. Appl. No. 12/916,348, dated Sep. 4, 2014.
Notice of Allowance, received in U.S. Appl. No. 12/916,348 , dated Mar. 23, 2015.
Non-Final Office Action, 24 pages, received in U.S. Appl. No. 13/088,265, dated Dec. 12, 2012.
Final Office Action, 33 pages, received in U.S. Appl. No. 13/088,265, dated Jul. 25, 2013.
Notice of Allowance, received in U.S. Appl. No. 13/088,265, dated Feb. 14, 2014.
Non-Final Office Action, 15 pages, received in U.S. Appl. No. 13/171,258, dated Jul. 13, 2012.
Final Office Action, 33 pages, received in U.S. Appl. No. 13/171,258, dated Jan. 11, 2013.
Non-Final Office Action, received in U.S. Appl. No. 13/171,258, dated Apr. 29, 2014.
Final Office Action, received in U.S. Appl. No. 13/171,258, dated Jan. 23, 2015.
Non-Final Office Action, 10 pages, received in U.S. Appl. No. 13/449,049, dated Dec. 13, 2012.
Notice of Allowance, 9 pages, received in U.S. Appl. No. 13/449,049, dated Apr. 29, 2013.
Notice of Allowance, 15 pages, received in U.S. Appl. No. 13/449,049, dated Aug. 13, 2013.
Non-Final Office Action, 9 pages, received in U.S. Appl. No. 13/449,140, dated Dec. 7, 2012.
Final Office Action, 13 pages, received in U.S. Appl. No. 13/449,140, dated Jul. 22, 2013.
Non-Final Rejection, received in U.S. Appl. No. 13/449,140, dated Nov. 15, 2013.
Notice of Allowance, received in U.S. Appl. No. 13/449,140, dated Aug. 11, 2014.
Notice of Allowance, received in U.S. Appl. No. 13/449,140, dated Nov. 20, 2014.
Non-Final Office Action, received in U.S. Appl. No. 13/683,969, dated Feb. 28, 2014.
Non-Final Office Action, received in U.S. Appl. No. 13/683,969, dated Nov. 14, 2014.
Notice of Allowance, received in U.S. Appl. No. 13/683,969, dated Feb. 4, 2015.
Notice of Allowance, received in U.S. Appl. No. 13/683,969 , dated Apr. 2, 2015.
Notice of Allowance, received in U.S. Appl. No. 13/866,682, dated Jun. 25, 2014.
Notice of Allowance, received in U.S. Appl. No. 13/866,682, dated Oct. 28, 2014.
Notice of Allowance, received in U.S. Appl. No. 13/866,682, dated Feb. 17, 2015.
Notice of Allowance received in U.S. Appl. No. 13/866,682, dated Jun. 5, 2015.
Non-Final Office Action, received in U.S. Appl. No. 13/918,067, dated Feb. 27, 2014.
Notice of Allowance, received in U.S. Appl. No. 13/918,067, dated Nov. 17, 2014.
Notice of Allowance, received in U.S. Appl. No. 13/918,067, dated Mar. 2, 2015.
Notice of Allowance received in U.S. Appl. No. 13/918,067, dated Jun. 15, 2015.
Non-Final Office Action, received in U.S. Appl. No. 14/262,511, dated Apr. 27, 2015.
Non-Final Office Action, received in U.S. Appl. No. 14/297,468, dated Feb. 26, 2015.
Non-Final Office Action, received in U.S. Appl. No. 14/297,506, dated Nov. 6, 2014.
Non-Final Office Action received in U.S. Appl. No. 14/608,033, dated Jul. 14, 2015.
Notice of Allowance received in U.S. Appl. No. 12/876,082, dated Jun. 17, 2015.
Chapin, John, "Hive: Operating System Fault Containment for Shared-Memory Multiprocessors," Technical Report No. CSL-TR-97-712, Computer Systems laboratory, Departments of Electrical Engineering and Computer Science, Stanford University, 156 pages, Jul. 1997.
Hung, Eugene, "Using Behavior Templates to Design Remotely Executing Agents for Wireless Clients," 2004 4th Workshop on Applications and Services in Wireless Networks (ASWN), (2004).
Susitaival, et al., "Analyizing the File Availability and Download Time in a P2P File Sharing System," IEEE, 2007, pp. 88-95.
Thinstall, "Application Virtualization: A Technical Overview of the Thinstall Application Virtualization Platform," Nov. 2006.
Zheng et al., "Sodon: A High Availability Multi-Source Content Distribution Overlay," IEEE, 2004, pp. 87-92.
Information Disclosure Statement Transmittal filed herewith.
Non-Final Office Action, dated Apr. 8, 2016, received in U.S. Appl. No. 13/171,258.
Non-Final Office Action, dated Sep. 21, 2016, received in U.S. Appl. No. 13/171,258.
Final Office Action, dated Apr. 6, 2017, received in U.S. Appl. No. 13/171,258.
Non-Final Office Action, dated Feb. 12, 2016, received in U.S. Appl. No. 14/245,707.
Final Office Action, dated Oct. 16, 2015, received in U.S. Appl. No. 14/297,468.
Non-Final Office Action, dated Feb. 10, 2016, received in U.S. Appl. No. 14/452,382.
Notice of Allowance, dated Sep. 12, 2016, received in U.S. Appl. No. 14/452,382.
Notice of Allowance, dated Jun. 7, 2016, received in U.S. Appl. No. 14/608,444.
Non-Final Office Action, dated Feb. 12, 2016, received in U.S. Appl. No. 14/789,813.
Final Office Action, dated Sep. 15, 2016, received in U.S. Appl. No. 14/789,813.
Notice of Allowance, dated Dec. 21, 2016, received in U.S. Appl. No. 14/789,813.
Non-Final Office Action, dated Dec. 15, 2016, received in U.S. Appl. No. 14/789,858.
Final Office Action, dated Jul. 13, 2017, received in U.S. Appl. No. 14/789,858.
Non-Final Office Action, dated Jul. 28, 2016, received in U.S. Appl. No. 14/877,790.
Final Office Action, dated May 8, 2017, received in U.S. Appl. No. 14/877,790.
Notice of Allowance, dated Jun. 23, 2016, received in U.S. Appl. No. 14/877,793.
Lodi, Giorgia, Middleware Services for Dynamic Clustering of Application Servers (University of Bologna, 2006), 99 pages.
VMware, "Introduction to VMware ThinApp" (Published Jun. 27, 2008) retrieved from http://www.vmware.com/pdf/thinapp_intro.pdf on Sep. 27, 2015.
Information Disclosure Statement Transmittal submitted herewith.
Non-Final Office Action, dated Oct. 4, 2017, filed in U.S. Appl. No. 13/171,258.
Non-Final Office Action, dated Oct. 5, 2017, filed in U.S. Appl. No. 14/877,790.
Non-Final Office Action, dated Nov. 14, 2017, filed in U.S. Appl. No. 15/081,703.
Non-Final Office Action, dated Jul. 5, 2018, received in U.S. Appl. No. 14/789,858.
Notice of Allowance, dated Jul. 31, 2018, received in U.S. Appl. No. 14/877,790.

METHOD AND SYSTEM FOR PUBLISHING VIRTUAL APPLICATIONS TO A WEB SERVER

CROSS-REFERENCE TO RELATED APPLICATIONS

This application is a continuation of U.S. patent application Ser. No. 12/906,904, filed on Oct. 18, 2010.

BACKGROUND OF THE INVENTION

Field of the Invention

The present invention is directed generally to methods and systems for publishing application files on a server to be distributed thereby, and more particularly to systems and methods of publishing virtualized application files on a web server for distribution thereby over the Internet.

Description of the Related Art

A virtual application is a virtual machine image preconfigured with all of the files, registry data, settings, components, runtimes, and other dependencies required for a specific application to execute immediately and without installation on a host computing device. The virtual application is partially isolated from other applications implemented on a host computing device and partially isolated from an underlying host operating system installed and executing on the host computing device. The virtual application is encapsulated from the host operating system by a virtual runtime environment, which includes a virtual operating system, that receives operations performed by the virtualized application and redirects them to one or more virtualized locations (e.g., a virtual filesystem, virtual registry, and the like).

Thus, the virtual application may be conceptualized as including two components: a virtualization runtime and a virtual application configuration. The virtualization runtime implements the virtual runtime environment, which implements various operating system application programming interfaces ("APIs") in such a way that allows the executing virtual application to access and interact with items that may not be present on the host computer. The virtual application configuration includes data necessary to implement the virtual application within the virtualization runtime.

The virtual application is stored in and implemented by one or more data files and/or executable files. Depending upon the implementation details, the one or more data files and/or executable files storing and implementing the virtual application may include blocks of data corresponding to each application file of a natively installed version of the application. Herein, these blocks of data will be referred to as "virtual application files." The one or more data files and/or executable files storing and implementing the virtual application also include configuration information.

The data files and/or executable files are configured to execute within a virtual runtime environment that is provided at least in part by the virtual operating system. When the virtual application is executed within the virtual runtime engine, the configuration information is used to configure the virtual operating system to execute the virtual application. For example, the configuration information may contain information related to the virtual application files, virtual registry entries, environment variables, services, and the like. The virtual operating system is configured to communicate with the host operating system as required to execute the virtual application on the host computing device. To publish a virtual application to a server (e.g., a web server) to be downloaded and/or executed by others, a user (e.g., an application publisher) must store copies of the data files and/or executable files implementing the virtual application within a virtual runtime environment to the server. Therefore, a need exists for a method and system configured to assist the user with uploading one or more data files and/or executable files to the server. The present application provides these and other advantages as will be apparent from the following detailed description and accompanying figures.

BRIEF DESCRIPTION OF THE SEVERAL VIEWS OF THE DRAWING(S)

DETAILED DESCRIPTION OF THE INVENTION

Figure 1:
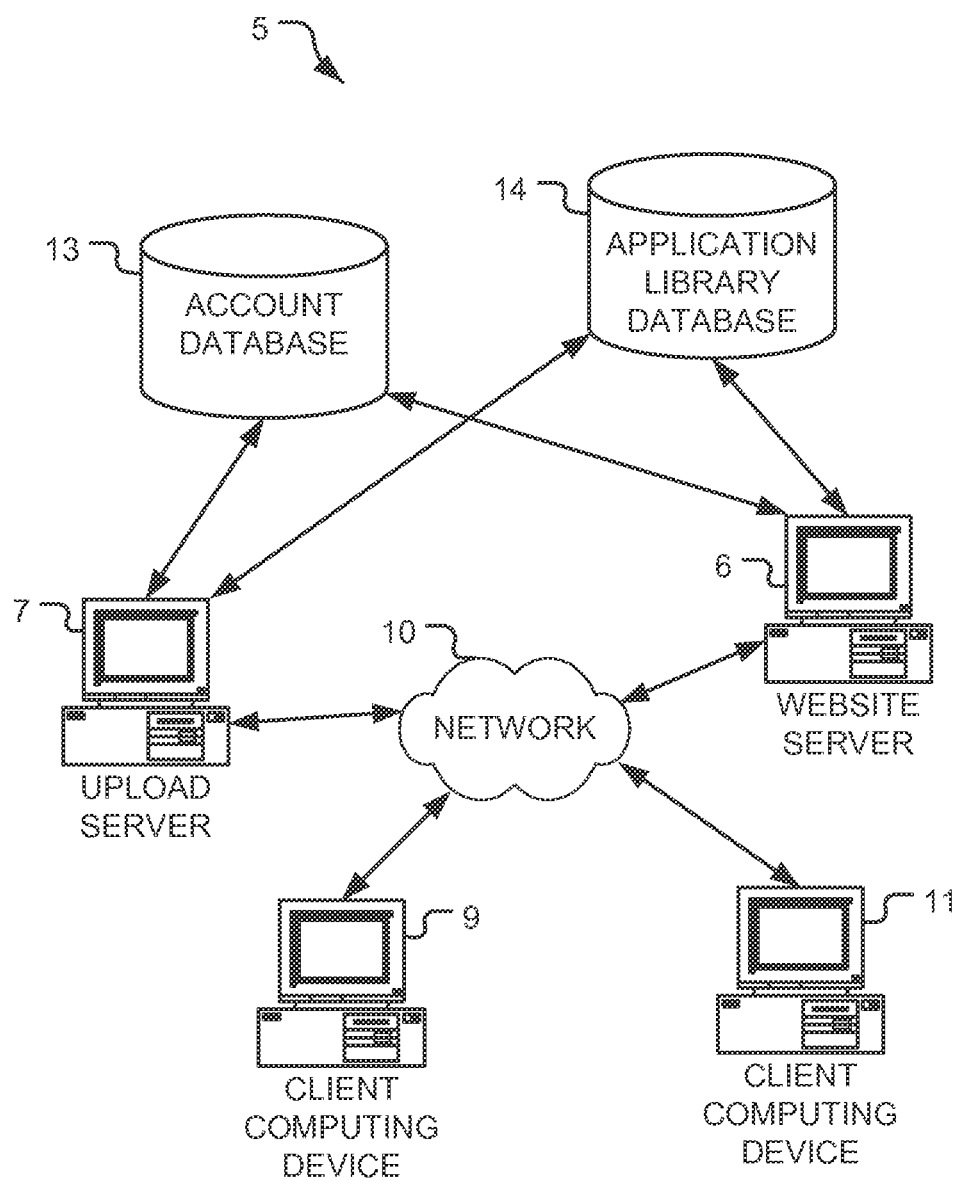
FIG. 1 is a diagram of a system for publishing an executable virtualized application file and/or an xlayer file from a first client computing device to a first server computing device (functioning as an upload server) over a network.

FIG. 1 illustrates a system 5 for publishing applications (e.g., virtual applications) residing on a client computing device 9 to a server computing device 7 (e.g., a web server) for distribution thereby to other computing devices (e.g., a client computing device 11) over a network 10 (e.g., the Internet, a WAN, a LAN, a combination thereof, and the like). One or more additional computing devices, such as a second server computing device 6 may also be coupled to the network 10. In the embodiment illustrated, the server computing devices 6 and 7 are each implemented as a web server. The server computing device 7 may be connected to one or more additional computing devices directly and/or over the network 10.

In the embodiment illustrated, the server computing device 7 functions as an upload server receiving the application to be published from the client computing device 9. The server computing device 7 copies the application to the server computing device 6, which functions as a website server. The server computing device 6 generates a website 190 (see FIG. 6) from which the application may be downloaded and/or executed (e.g., by the client computing device 11). Optionally, execution of the downloaded application may be profiled to generate one or more transcripts that may be used to generate a streaming model.

The server computing devices 6 and 7 are each connected to an Account Database 13 and an Application Library Database 14. While illustrated as separate databases, as is apparent to those of ordinary skill in the art, the Account and Application Library Databases 13 and 14 may be implemented in the same database. Further, the Account and Application Library Databases 13 and 14 may be implemented on one or more computing devices (not shown).

The Account Database 13 stores information related to each user account. The Application Library Database 14 stores information related to each application uploaded to the server computing device 7.

The system 5 may be used to distribute application files (e.g., virtualized application files). Further, the system 5 may be used to track application versions and make different versions of a particular application available to users.

A diagram of hardware and an operating environment in conjunction with which implementations of the server computing device 6, the server computing device 7, the client computing device 9, the client computing device 11, the Account Database 13, the Application Library Database 14, and the network 10 may be practiced is provided in FIG. 11 and described below.

Figure 2:
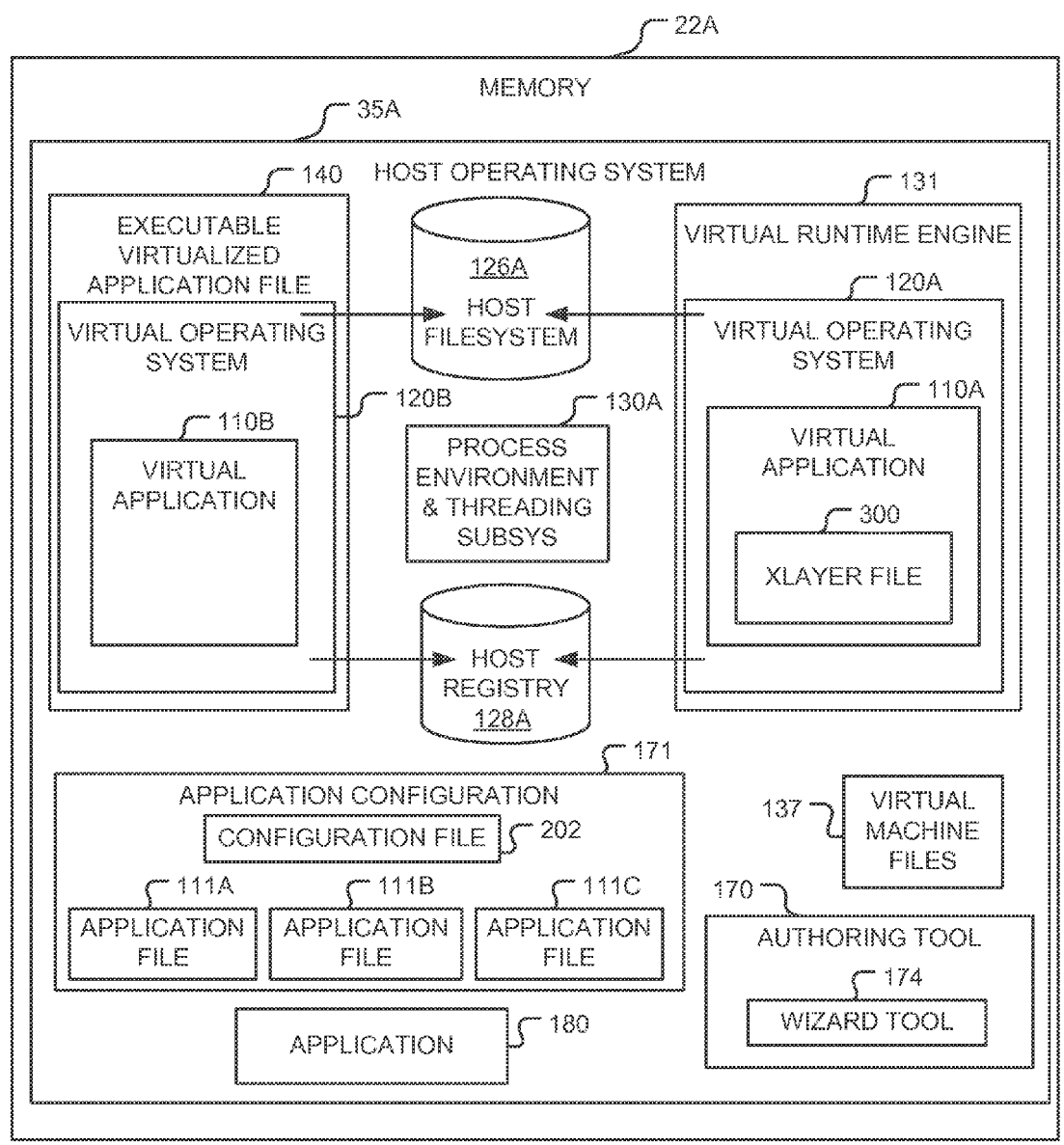
FIG. 2 is an illustration of a conceptualization of software components stored in a system memory of the first client computing device of FIG. 1.

FIG. 2 illustrates a system memory 22A of the client computing device 9 (illustrated in FIG. 1) storing a conventional operating system 35A, that like most operating systems, includes a filesystem 126A, a registry 128A, and a process environment and threading subsystems component 130A. As explained above, applications may be transferred from the client computing device 9 to the server computing device 7 for distribution thereby.

A virtual application may be implemented as an executable virtualized application file 140 or an xlayer file 300 configured to execute within a virtualized environment provided by a virtual machine (or a virtual runtime engine 131). The executable virtualized application file 140 and the xlayer file 300 may each be characterized as being a virtualized application file. FIG. 2 illustrates a virtual application 110A implemented by the execution of the xlayer file 300 by the virtual runtime engine 131. FIG. 2 also illustrates a virtual application 110B implemented by the execution of the executable virtualized application file 140. The virtual runtime engine 131 may execute within an operating system shell process.

U.S. patent application Ser. No. 12/697,029, filed on Mar. 31, 2010, entitled Method and System for Improving Startup Performance and Interoperability of a Virtual Application, which is incorporated herein by reference in its entirety, describes a file format that may be used to configure the xlayer file 300. The virtualized application file 140 and the xlayer file 300 may each be implemented as a binary file.

Depending upon the implementation details, the xlayer file 300 may include publisher information, application information, and version information (including revision information). The version information may have four components: a major version; a minor version; a build version; and a revision number. Patches to a particular application may be identified by the build version and the revision number components. The xlayer file 300 may also include additional information such as domain information.

The system memory 22A may store one or more files implementing one or more virtual runtime engines. By way of a non-limiting example, the system memory 22A may include a plurality of virtual machine executable files 137 that when executed, each implements a different virtual machine. For example, each of the virtual machine executable files 137 may implement a different version of the same virtual machine. The virtual machine executable files 137 may be executed individually. When executed, a virtual machine executable file implements a virtualized environment.

A natively installed version of an application 180 is configured to execute within a runtime environment provided at least in part by the host operating system 35A. Typically, to execute within the runtime environment provided at least in part by the host operating system 35A, the natively installed version of the application 180 modifies the configuration and settings of the host operating system 35A. For example, the natively installed version may install dynamic link libraries or change registry settings of the host operating system 35A. In contrast, a virtual version of the same application may be executed on the host operating system 35A without installation on the host operating system 35A. On the other hand, the virtual applications 110A and 110B do not modify the configuration or settings of the host operating system 35A. For example, to execute the virtual applications 110A and 110B, dynamic link libraries ("dlls"), data files, registry settings, environment variables, and the like need not be modified on to the host operating system 35A.

The virtualized application file 140 may include components necessary to implement a virtual runtime environment including a virtual operating system 120B configured to execute in the operating system 35A of the client computing device 9 (illustrated in FIG. 1). Similarly, the virtual runtime engine 131 includes components necessary to implement a virtual runtime environment including a virtual operating system 120A configured to execute in the operating system 35A of the client computing device 9 (illustrated in FIG. 1). The virtual operating systems 120A and 120B are configured to intercept calls to the host operating system 35A and route them to corresponding components of the virtual operating systems 120A and 120B, respectively. The virtual operating systems 120A and 120B may also route some requests and actions to the host operating system 35A and 35B, respectively, for processing.

In the embodiment illustrated in FIG. 2, the virtualized application file 140 and the xlayer file 300 each implement a virtualized version of the application 180. U.S. patent application Ser. No. 12/188,155, filed on Aug. 7, 2008, U.S. patent application Ser. No. 12/188,161 filed on Aug. 7, 2008, and U.S. patent application Ser. No. 12/685,576 filed on Jan. 11, 2010, all of which are incorporated herein by reference in their entireties, disclose systems that may be used to create and configure the virtualized application file 140 and/or the xlayer file 300. As described in greater detail in U.S. patent application Ser. Nos. 12/188,155, 12/188,161, and 12/685,576, a virtual application constructor or authoring tool 170 may use an application template that includes copies of files, such as a configuration file 202, application files 111A-111C, and the like, to configure the virtualized application file 140 or the xlayer file 300. However, the template is not a requirement. Instead, the authoring tool 170 needs only the configuration file 202 and copies of any applications files 111A-111C (necessary for a natively installed version of the application to execute) to build the virtualized application file 140 or the xlayer file 300. The applications files 111A-111C and the configuration file 202 are referred to collectively as an application configuration 171. The authoring tool 170 may combine the application configuration 171 and the components of the virtual runtime engine (e.g., the virtual operating system 120) to construct or build the executable virtualized application file 140. Alternatively, the authoring tool 170 may use the application configuration 171 to build the xlayer file 300. As described in U.S. patent application Ser. Nos. 12/188,155 and 12/188,161, the application configuration 171 may be created using a snapshot technique or other process (e.g., manually specifying the application configuration 171) operable to capture the application configuration 171 based on the application 180.

The authoring tool 170 includes a wizard tool 174 operable to communicate with the server computing device 7 (which functions as an upload server) for the purposes of publishing a virtual application (e.g., one of the publishing virtual applications 110A and 110B) on the website 190 (see FIG. 6) generated by the server computing device 6 (which functions as an website server).

Depending upon the implementation details, the process of publishing a virtual application (e.g., one of the publishing virtual applications 110A and 110B) to the server computing device 7 may include (1) creating a publisher account, (2) adding information related to the virtual application (e.g., configuration information) to the Application Library Database 14 (see FIG. 1), and (3) uploading the file (referred to as a "file to be published") to the server computing device 7 (see FIG. 1). The wizard 174 may walk the user through this process. The file to be published may be the virtualized application file 140 and/or the xlayer file 300. Thus, the wizard tool 174 is operable to transfer the virtualized application file 140 and/or the xlayer file 300 to the server computing device 7. For ease of illustration, after the file to be published has been transferred (by the wizard tool 174) to the server computing device 7, the file to be published will be referred to as an uploaded file 192 (see FIG. 3). While the file to be published is described above as being either the virtualized application file 140 or the xlayer file 300, the file to be published may be any application file a user wishes to publish to the website 190 (see FIG. 6).

The wizard tool 174 is also operable to receive input from a user and forward that information to the server computing device 7. The input received includes user account information (e.g., user name, password, etc.) and information related to or associated with the file to be published (e.g., application name, application version, etc.).

As mentioned above, the server computing device 7 transfers or copies the uploaded file 192 (see FIG. 3) to the server computing device 6. The server computing device 7 (which functions as an upload server) is further operable to communicate with the Account Database 13 for the purposes of obtaining and storing information related to the user account associated with the uploaded file 192 (see FIG. 3). The server computing device 7 is also operable to communicate with the Application Library Database 14 for the purposes of obtaining and storing information related to the uploaded file 192 (see FIG. 3) and the virtual application(s) associated therewith.

Figure 3:
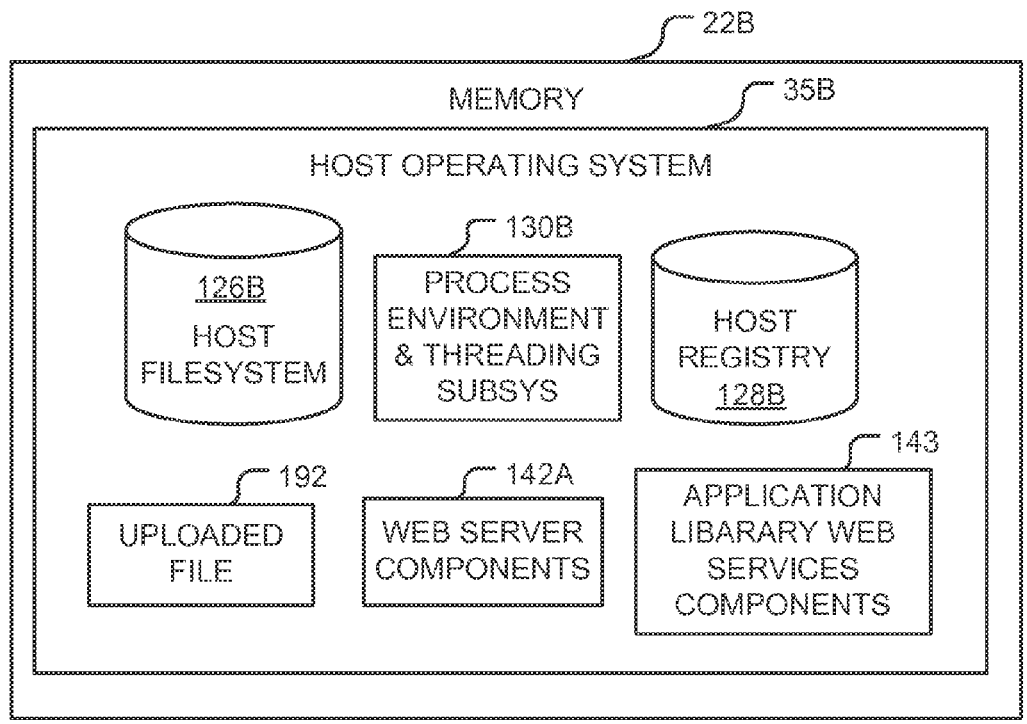
FIG. 3 is an illustration of a conceptualization of software components stored in memory and executing on the first server computing device of FIG. 1.

The server computing device 6 is operable to generate the website 190 (see FIG. 6) including a link for each of the uploaded files (e.g., the uploaded file 192 illustrated in FIG. 3). Other computing devices (e.g., the client computing device 11 illustrated in FIG. 1) may navigate to the website 190 (see FIG. 6) and select the links to thereby download and/or execute the uploaded files.

While illustrated as being outside the filesystem 126A, those of ordinary skill in the art appreciate that the executable virtualized application file 140, the xlayer file 300, the application configuration 171, the application 180, the virtual machine files 137, and the authoring tool 170 may be conceptualized as being within the filesystem 126A.

FIG. 3 illustrates a system memory 22B of the server computing device 7 (illustrated in FIG. 1). The system memory 22B stores a conventional host operating system 35B that, like most operating systems, includes a host filesystem 126B, a host registry 128B, and a process environment and threading subsystems component 130B. In the embodiment illustrated, the system memory 22B stores web server components 142A configured to implement a web server. However, the server computing device 7 need not generate a website (such as the website 190 illustrated in FIG. 6). Instead, in the embodiment illustrated, the web server components 142A need only provide web services. The wizard 174 is configured to communicate with the web server components 142A (e.g., via Hypertext Transfer Protocol (HTTP)). By way of non-limiting examples, the web server components 142A may implement Internet Information Services ("IIS") provided by Microsoft Corporation, Apache, and the like.

The system memory 22B also stores application library web services components 143 configured to communicate with the Account and Application Library Databases 13 and 14 (e.g., using Structured Query Language ("SQL")) and perform other functions described below. The wizard 174 communicates with the web server components 142A, which access the application library web services components 143 requested by the wizard 174. While illustrated as being outside the filesystem 126B, those of ordinary skill in the art appreciate that the uploaded file 192, the web server components 142A, and the application library web services components 143 may be conceptualized as being within the filesystem 126B.

Figure 4:
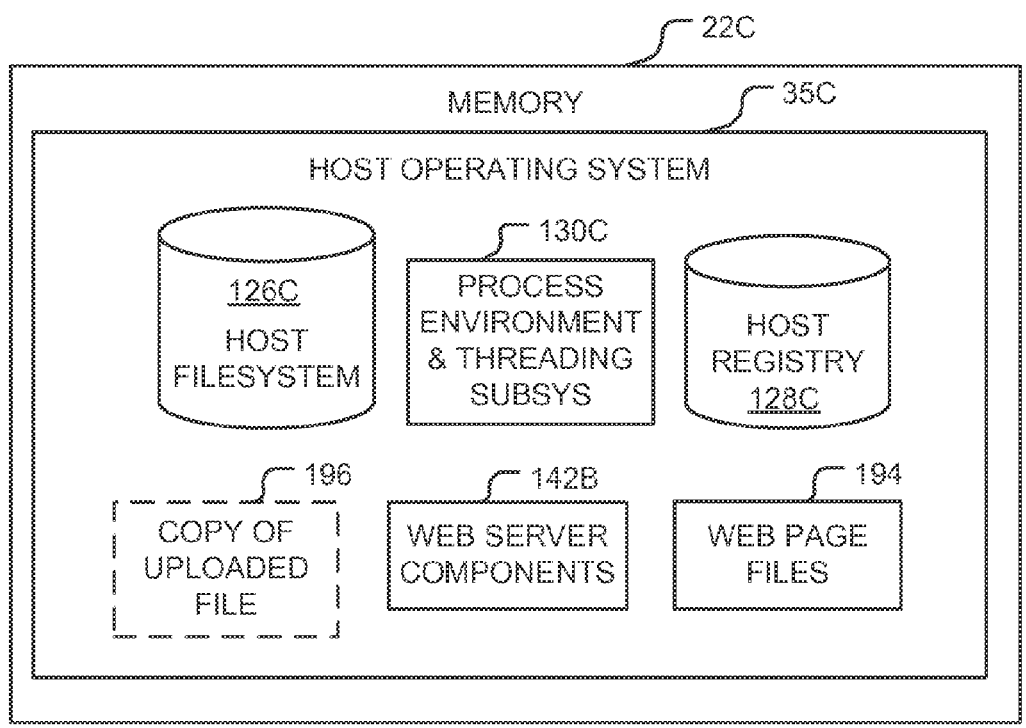
FIG. 4 is an illustration of a conceptualization of software components stored in memory and executing on a second server computing device (functioning as a website server) of FIG. 1 configured to generate a website for displaying a link to a copy of the published file.

FIG. 4 illustrates a system memory 22C of the server computing device 6 (illustrated in FIG. 1). The system memory 22C stores a conventional host operating system 35C that, like most operating systems, includes a host filesystem 126C, a host registry 128C, and a process environment and threading subsystems component 130C. In the embodiment illustrated, the system memory 22C stores web server components 142B configured to implement a web server. The web server components 142B are configured to serve web page files 194 to thereby generate the website 190 (see FIG. 6) having a link a copy of the uploaded file 196. Optionally, the copy of the uploaded file 196 may be stored in the system memory 22C. However, this is not a requirement and the link may direct a user to the uploaded file 192 (see FIG. 3) stored on the server computing device 7 (illustrated in FIG. 1) or a copy of the uploaded file on a different server computing device. By way of non-limiting examples, the web server components 142B may implement Internet Information Services ("IIS") provided by Microsoft Corporation, Apache, and the like. While illustrated as being outside the filesystem 126C, those of ordinary skill in the art appreciate that the web server components 142B, the optional copy of the uploaded file 196, and the web page files 194 may be conceptualized as being within the filesystem 126C.

Figure 5:
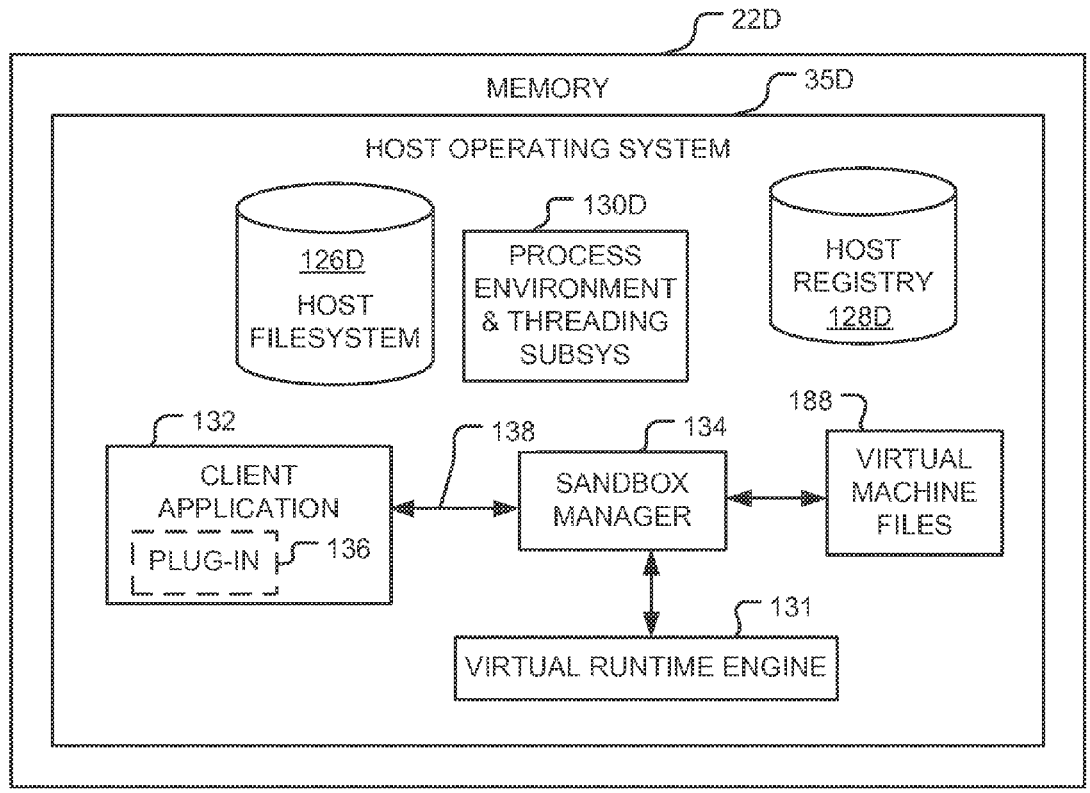
FIG. 5 is an illustration of a conceptualization of software components stored in memory and executing on a second client computing device of FIG. 1 configured to download, execute, and/or profile execution of a copy of the published file.

FIG. 5 illustrates a system memory 22D of the client computing device 11 (illustrated in FIG. 1) storing a conventional operating system 35D, that like most operating systems, includes a filesystem 126D, a registry 128D, and a process environment and threading subsystems component 130D. A Client Application 132 (e.g., a web browser application) and a Sandbox Manager 134 are also stored in the system memory 22D of the client computing device 11 (illustrated in FIG. 1). Optionally, the Client Application 132 may include a plug-in 136 or similar application. In the embodiment illustrated, the Client Application 132 communicates with the Sandbox Manager 134 over a communication link 138 that may be implemented as a Transmission Control Protocol ("TCP") connection using TCP protocol. Each virtualized application file being transferred and/or executed may be identified by a unique session identifier ("SessionId"). The Sandbox Manager 134 and Client Application 132 are described in detail in U.S. patent application Ser. No. 12/695,107, filed on Jan. 27, 2010, and U.S. patent application Ser. No. 12/705,492, filed on Feb. 12, 2010 both titled SYSTEM FOR DOWNLOADING AND EXECUTING A VIRTUAL APPLICATION. U.S. patent application Ser. Nos. 12/695,107 and 12/705,492 are both incorporated herein by reference in their entirety.

Virtual machine files 188 are also stored in the system memory 22D. The virtual machine files 188 may be substantially identical to the virtual machine files 137 stored in the system memory 22A (see FIG. 2). Execution of a virtual machine file (e.g., one of the virtual machine files 188) may be initiated by the Sandbox Manager 134 using a command including a parameter (e.g., a file path) identifying a virtualized application file to execute. The virtualized application file may include a downloaded copy of the xlayer file 300 or a portion thereof sufficient to initiate execution. In response to receiving the parameter, the virtual machine executable file executes the identified virtualized application file inside the virtualized environment implemented by the virtual machine executable file.

Together the Client Application 132 and the Sandbox Manager 134 may download and/or execute a virtual application. In embodiments in which the Client Application 132 includes the plug-in 136, a user may click on a link or otherwise select an application file displayed on the website 190 (see FIG. 6) for download and/or execution. The website 190 (or selection of the application file) launches the plug-in 136, which established the communication link 138 with the Sandbox Manager 134. The Sandbox Manager 134 identifies which of the virtual machine files 188 is configured to execute the virtual runtime engine 131 that is configured to execute the application file selected by the user and launches the virtual machine file identified. The Sandbox Manager 134 determines whether the application is to be executed in profile mode. The selection mechanism (e.g., a link clicked by the user) may include a parameter value (e.g., a flag) that indicates whether execution of the application file is to be profiled. If the application is to be executed in profile mode, the Sandbox Manager 134 instructs the virtual runtime engine 131 to operate in profile mode. As the virtual runtime engine 131 executes the application file in profile mode, the Sandbox Manager 134 collects profile information (supplied by the virtual runtime engine 131) and stores it in one or more transcripts that may be used to profile a virtual application's access to the underlying original application file (e.g., the xlayer file 300).

A profiling process and process of generating a streaming model from one or more transcript files are described in greater detail in U.S. patent application Ser. No. 12/877,918, filed on Sep. 8, 2010, titled METHOD AND SYSTEM FOR BUILDING AND DISTRIBUTING APPLICATION PROFILES VIA THE INTERNET, which is incorporated herein by reference in its entirety.

The system 5 (see FIG. 1) may be characterized as implementing an application library that includes the uploaded files (e.g., the uploaded file 192 illustrated in FIG. 3, the copy of the uploaded file 196 illustrated in FIG. 4, and the like), Application Library Web Services (implemented by the application library web services components 143 illustrated in FIG. 3), and the Account and Application Library Databases 13 and 14 (see FIG. 1). The authoring tool 170 (see FIG. 2) and the application library perform a method 500 illustrated in FIG. 8 and described in detail below.

Application Library Web Services

Referring to FIG. 3, the Application Library Web Services (implemented by the application library web services components 143) provide an application programming interface ("API") to publish a virtual application (e.g., one of the virtual applications 110A and 110B illustrated in FIG. 2) to the application library. By way of a non-limiting example, the Application Library Web Services may include the following seven services:

1. AccountLogin Web Service;
2. GetApplications Web Service;
3. CreateApplication Web Service;
4. StartUploadData Web Service;
5. Upload Data Web Service;
6. CompleteUpload Web Service; and
7. IsAppReadyForTesting Web Service.

The above Application Library Web Services are described in detail in the description of the method 500 (illustrated in FIG. 10) provided below.

Referring to FIG. 2, the wizard 174 may walk the user through the process of publishing a virtual application to the server computing device 7 (see FIG. 1) and communicate with the application library via the Application Library Web Services (implemented by the application library web services components 143 illustrated in FIG. 3). By way of a non-limiting example, the Application Library Web Services may be implemented using Extensible Markup Language ("XML") Web Services over Hypertext Transfer Protocol ("HTTP"). By way of another non-limiting example, the wizard 174 may call the Application Library Web Services over HTTP.

Account and Application Library Databases

Figure 7:
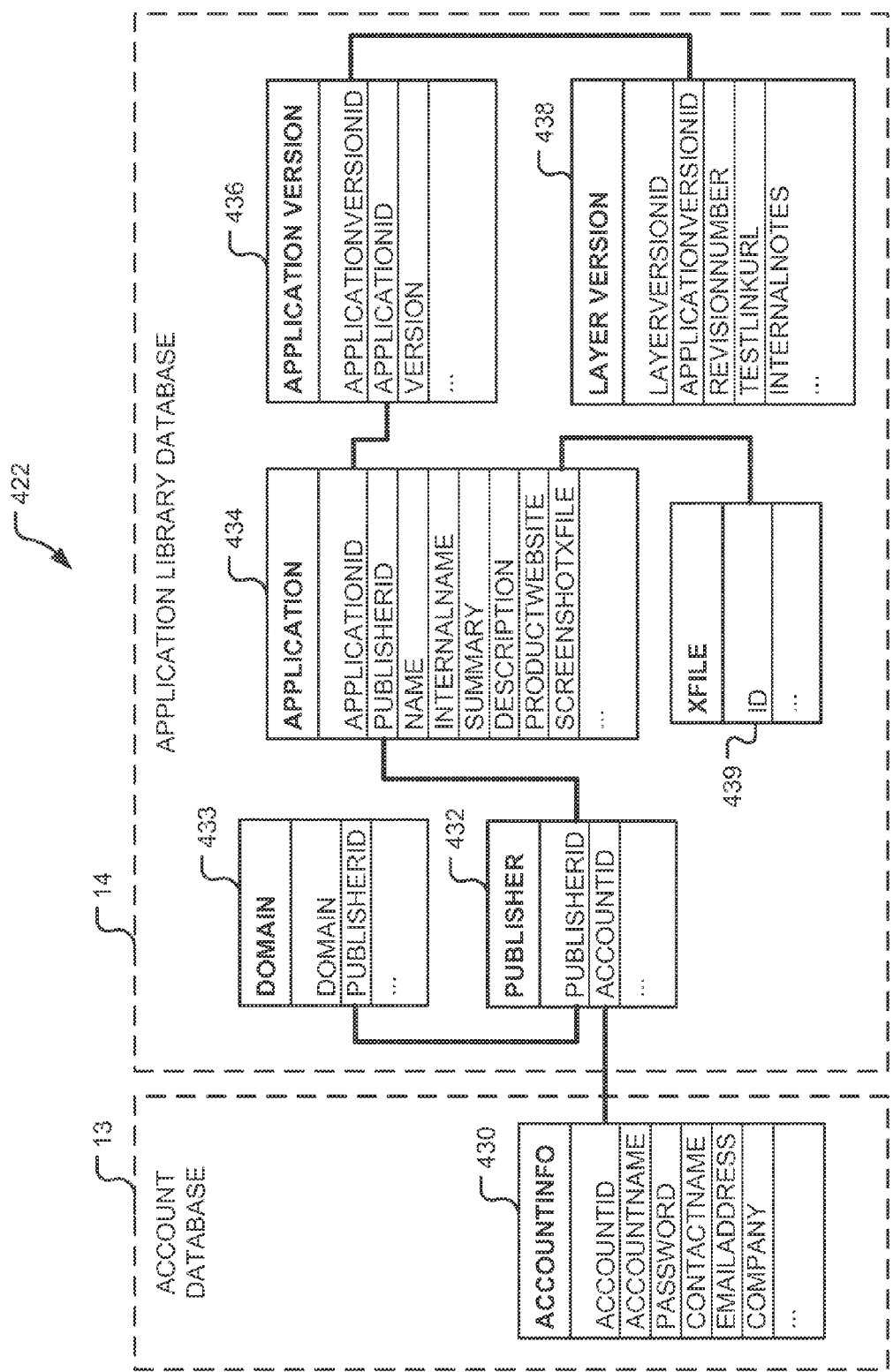
FIG. 7 is a data model implemented by an account database and an application library database.

FIG. 7 illustrates a data model 422 that may be implemented by the Account and Application Library Databases 13 and 14. The data model 422 includes an AccountInfo table 430, a Publisher table 432, a Domain table 433, an Application table 434, an Application Version table 436, a Layer Version table 438, and an XFile table 439.

The AccountInfo table 430 includes one or more fields. By way of non-limiting examples, the AccountInfo table 430 may include the following fields: AccountID; Account or User Name; Contact Name; Email Address; Company; and Password. Each account may be assigned a unique AccountID value, which is stored in the AccountID field and may be used as a key in the AccountInfo table 430. The AccountID value assigned to the account uniquely identifies that account.

The Publisher table 432 includes one or more fields. By way of non-limiting examples, the Publisher table 432 may include the following fields: PublisherID; and AccountID. Each user identified in the Publisher table 432 may be assigned a unique PublisherID value, which is stored in the PublisherID field and may be used as a key in the Publisher table 432. The Publisher table 432 may include a record for each unique AccountID value in the AccountID field of the AccountInfo table 430. In other words, the records Publisher table 432 may have a one-to-one relationship with the records in the AccountInfo table 430 and the Publisher table 432 may be linked to the AccountInfo table 430 by the values in the AccountID field. The PublisherID value assigned to the publisher uniquely identifies that publisher (or user).

The Domain table 433 includes one or more fields. By way of non-limiting examples, the Domain table 433 may include the following fields: Domain; and PublisherID. The Domain field stores a web address associated with a particular publisher. The Domain table 433 may include one or more records for each publisher identified by a unique PublisherID value in the PublisherID field of the Publisher table 432. In other words, the records Publisher table 432 may have a one-to-many relationship with the records in the Domain table 433 and the Publisher table 432 may be linked to the Domain table 433 by the values in the PublisherID field.

The Application table 434 includes one or more fields. By way of non-limiting examples, the Application table 434 may include the following fields: ApplicationID; PublisherID; Name; InternalName; Summary; Description; ProductWebsite; and ScreenShotXFile. Each application identified in the Application table 434 may be assigned a unique ApplicationID value, which is stored in the ApplicationID field and may be used as a key in the Application table 434. The ApplicationID value assigned to the application uniquely identifies that application. The Application table 434 may include one or more records for each publisher identified by a unique PublisherID value in the PublisherID field of the Publisher table 432. In other words, the records Publisher table 432 may have a one-to-many relationship with the records in the Application table 434 and the Publisher table 432 may be linked to the Application table 434 by the values in the PublisherID field.

The Application Version table 436 includes one or more fields. By way of non-limiting examples, the Application table 434 may include the following fields: ApplicationVersionID; ApplicationID; and Version. A unique ApplicationVersionID value is assigned to each version of a particular application. Thus, the ApplicationVersionID value assigned to a particular version of a particular application uniquely identifies that version of the particular application. The Application Version table 436 may include one or more records for each application identified by a unique ApplicationID value in the ApplicationID field of the Application table 434. In other words, the records Application table 434 may have a one-to-many relationship with the records in the Application Version table 436 and the Application table 434 may be linked to the Application Version table 436 by the values in the ApplicationID field.

The Layer Version table 438 includes one or more fields. By way of non-limiting examples, the Application table 434 may include the following fields: LayerVersionID; ApplicationVersionID; Revision Number; TestLinkURL; and InternalNotes. A unique LayerVersionID value is assigned to each layer of each version of a particular application. Thus, the LayerVersionID value assigned to a particular layer of a particular version of a particular application uniquely identifies that layer of the particular version of the particular application. The Layer Version table 438 may include one or more records for each record in the Application Version table 436. In other words, the records Application Version table 436 may have a one-to-many relationship with the records in the Layer Version table 438 and the Layer Version table 438 may be linked to the Application Version table 436 by the values in the ApplicationVersionID field.

The XFile table 439 includes one or more fields. By way of non-limiting examples, the XFile table 439 may include an ID field that uniquely identifies each file to be published. U.S. patent application Ser. No. 12/877,918 describes the XFile table 439 and other tables related thereto. As explained in U.S. patent application Ser. No. 12/877,918, the uploaded file 192 (see FIG. 3) or the copy of the uploaded file 196 (see FIG. 4) may be used to create transcripts that may be combined or merged to generate a streaming model. Records in the XFile table 439 may be linked to records in other tables to indicate the existence of a new streaming model (not shown) for the uploaded file 192, and to identify on which server(s) the streaming model is stored.

The Application table 434 may include one record for each record (identified by a unique value in the ID field) of the XFile table 439. In other words, the records Application table 434 may have a one-to-one relationship with the records in the XFile table 439 and the Application table 434 may be linked to the XFile table 439 by the values in the ScreenShotXFile field of the Application table 434 and the values in the ID field of the XFile table 439.

The Account Database 13 may include the AccountInfo table 430. The Application Library Database 14 may include the Publisher table 432, the Application table 434, the Application Version table 436, and the Layer Version table 438. Optionally, the Application Library Database 14 may also include the Domain table 433 and the XFile table 439.

Method 500

Figure 8:
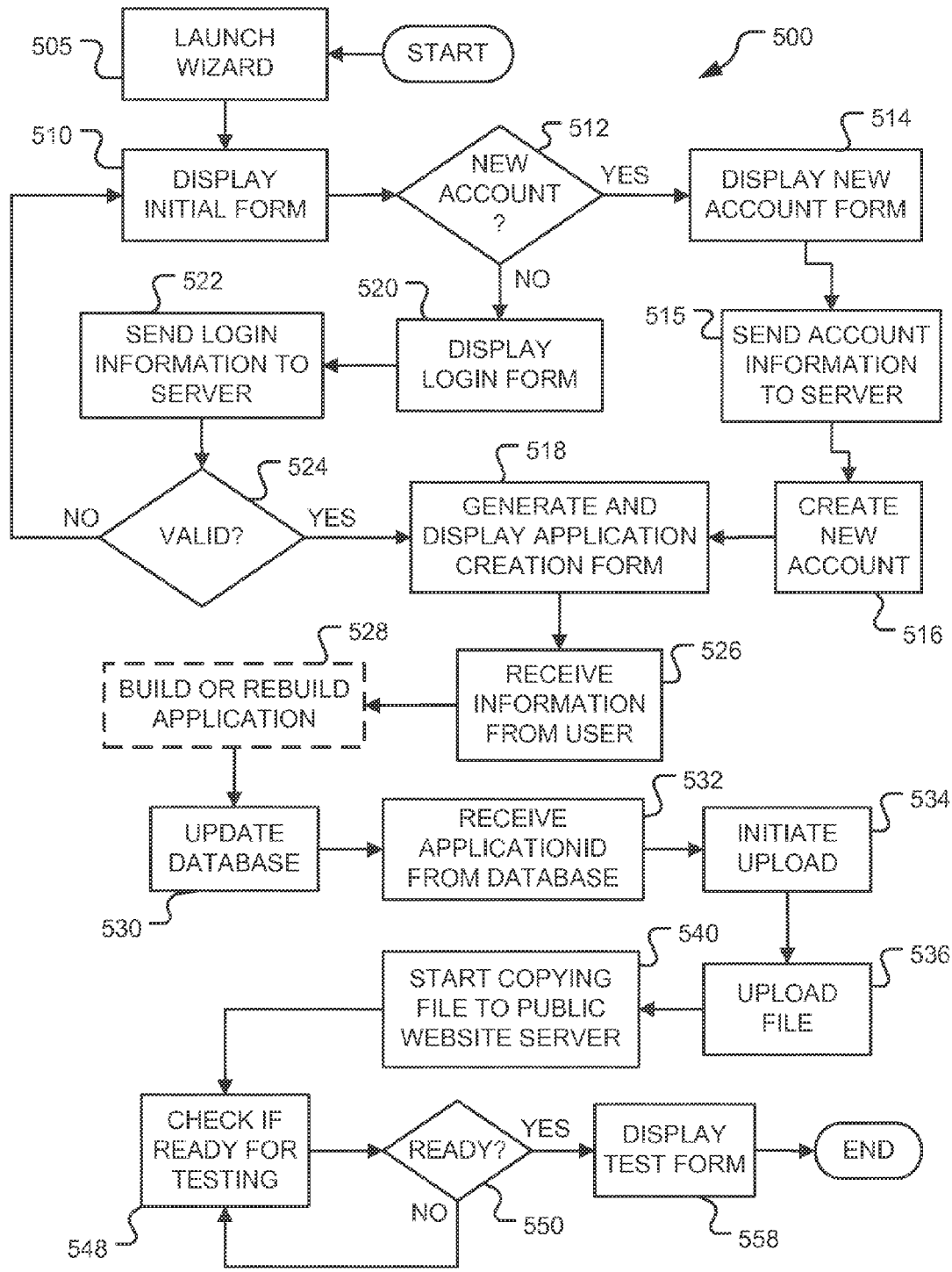
FIG. 8 is a flow diagram of a method that may be performed to publish a file on the website of FIG. 6.
Figure 9:
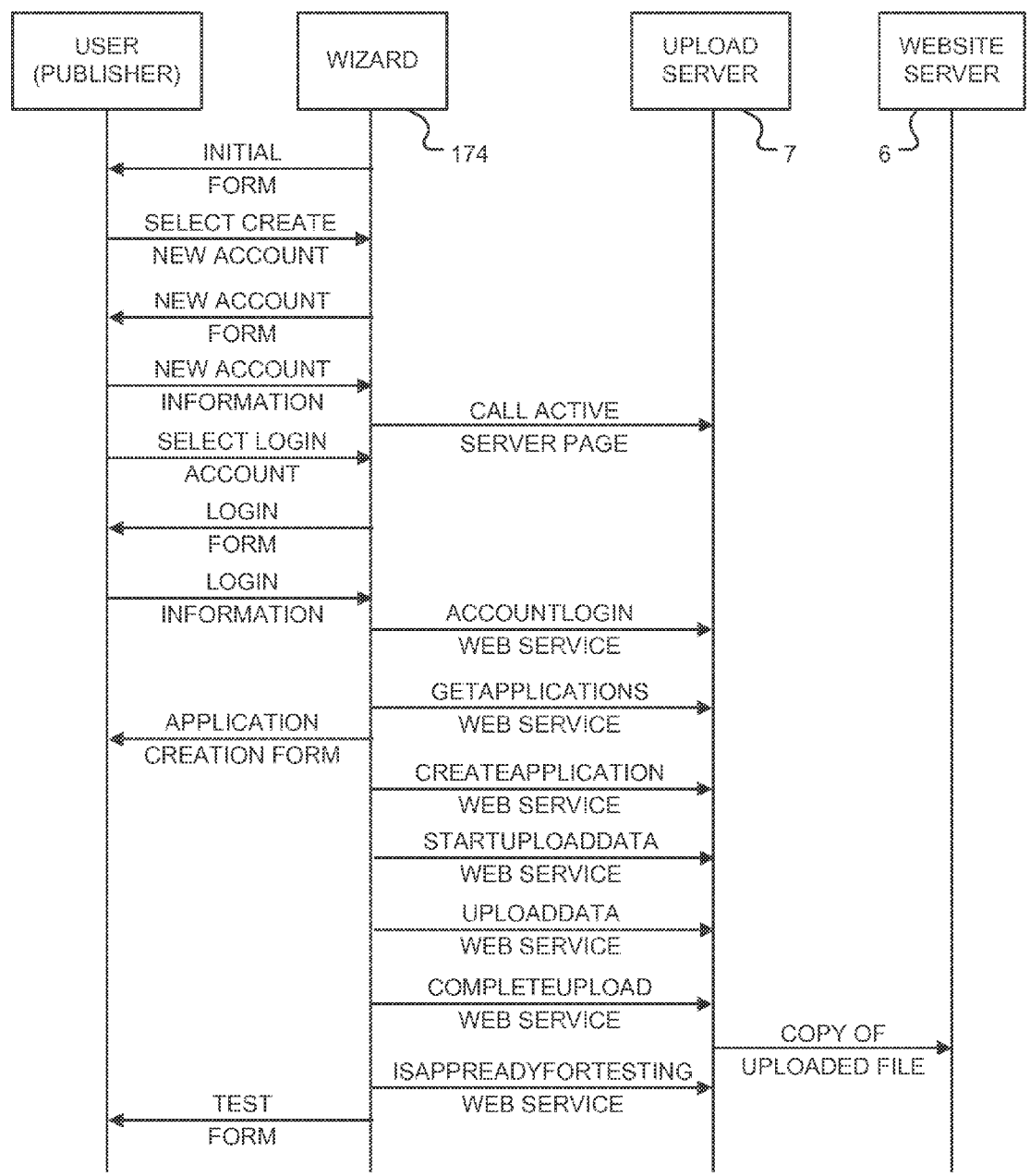
FIG. 9 is a diagram illustrating exemplary communications between a user, the first client computing device, the first server computing device, and the second server computing device.

FIG. 8 is a flow diagram of a method 500 performed by the authoring tool 170 (see FIG. 2) and the Application Library Web Services (implemented by the application library web services components 143 illustrated in FIG. 3). FIG. 9 is a diagram illustrating communications occurring between the user, the wizard 174 of the authoring tool 170 (see FIG. 2), the server computing device 7 (which functions as an upload server), and the server computing device 6 (which functions as a website server) as the method 500 is performed. Therefore, the method 500 will be described with reference to FIGS. 8 and 9.

Figure 10:
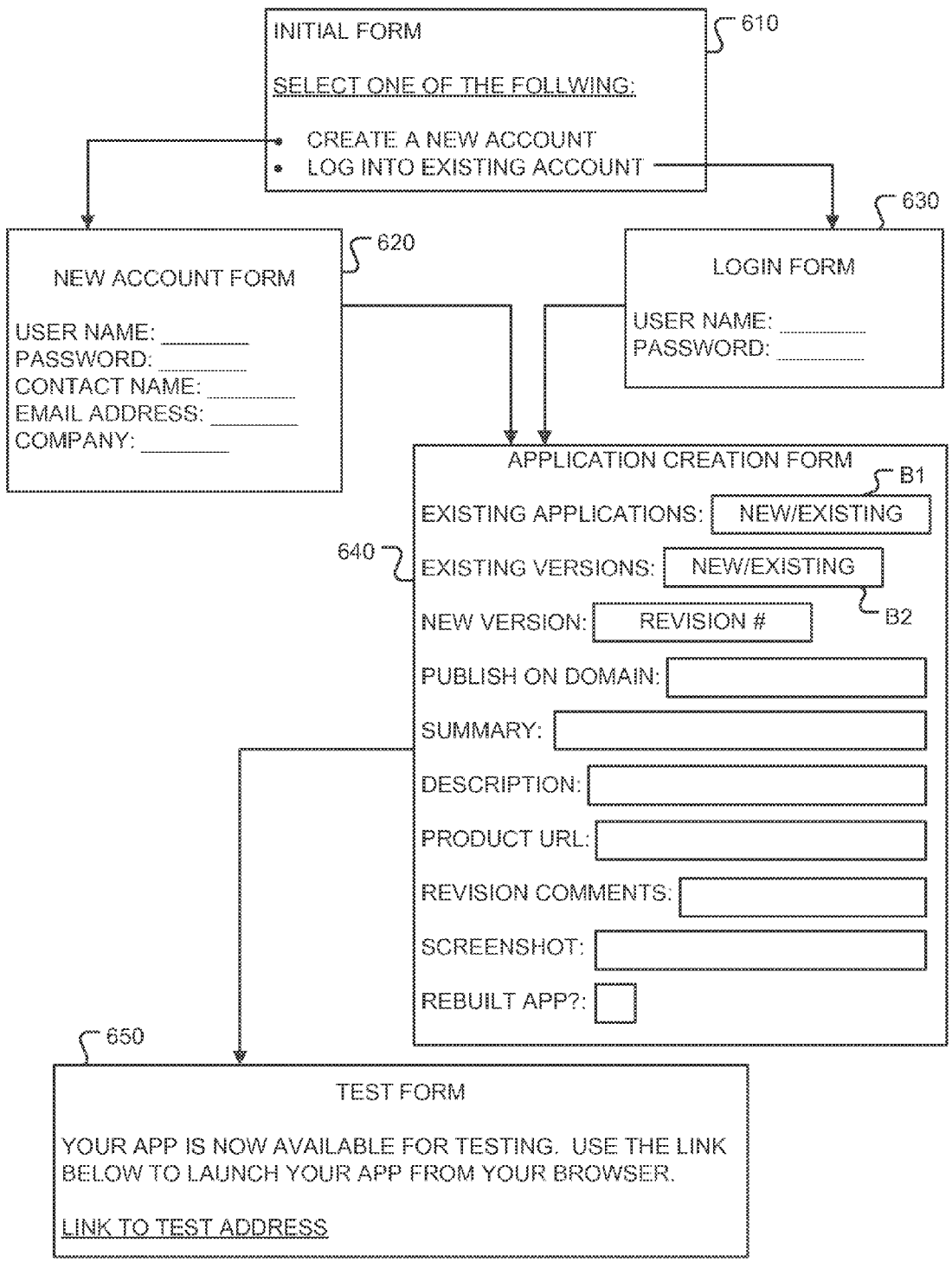
FIG. 10 is a block diagram illustrating user interface components (e.g., forms) displayed to the user by the wizard executing on the first client computing device.

In first block 505, the wizard 174 launches and connects to the server computing device 7. Then, in block 510, the wizard 174 displays an initial form 610 (see FIG. 10) to a user (e.g., an application publisher). Turning to FIG. 10, the initial form 610 displays login choices that may include an option to create a new account or log into an existing account. When the first time the user attempts to publish an application to the website 190 (see FIG. 6), the user may select the "create a new account" option to create a new account. Returning users to the website 190 (see FIG. 6) may select the "log into an existing account" option to log into their existing accounts using previously specified credentials (e.g., an account name, and password).

Returning to FIGS. 8 and 9, in decision block 512, the wizard 174 receives a selection from the user and determines whether the user has chosen to create a new account. The decision in decision block 512 is "YES" when the user has chosen to create a new account. When the user has chosen to log into an existing account, the decision in decision block 512 is "NO."

When the decision in decision block 512 is "YES," in block 514, the wizard 174 displays a new account form 620 (see FIG. 10) configured to request information from the user. Turning to FIG. 10, to create the new account, the user inputs information into the new account form 620. The new account form 620 may request basic account information, such as Account or User Name, Contact Name, Email Address, Company, Password, and the like.

Then, the user submits the new account form 620. Returning to FIGS. 8 and 9, the wizard 174 detects that the user has submitted the new account form 620 (see FIG. 10) and in block 515, forwards the information entered into the new account form 620 to the server computing device 7. In the embodiment illustrated, the information sent to the server computing device 7 is received by the web server components 142A (see FIG. 3). By way of a non-limiting example, the information provided by the user in the new account form 620 (see FIG. 10) may be sent to the server computing device 7 as query string parameters (e.g., appended to a Uniform Resource Locator ("URL")) to an Active Server Page Extended page (e.g., having the extension "aspx") over a Secure Sockets Layer ("SSL") connection.

In block 516, the Active Server Page Extended page (which executes on the server computing device 7) or other computer-executable instructions executing on the server computing device 7 creates a new account for the user by storing the information provided by the user in the AccountInfo table 430 (see FIG. 7) in the Account Database 13 (see FIG. 7). As is apparent to those of ordinary skill in the art, before a new record is created, the AccountInfo table 430 (see FIG. 7) may be queried for the account name provided by the user to ensure multiple records do not include the same value in the Account Name field. If the query returns a record, the server computing device 7 may inform the wizard 174 that an account having the account name provided already exists. Then the wizard 174 may instruct the user to enter a different Account Name. If the query does not return a record, the server computing device 7 stores the account name and password as well as other information provided by the user in the AccountInfo table 430 (see FIG. 7). Then, the wizard 174 advances to block 518.

When the decision in decision block 512 is "NO," in block 520, the wizard 174 displays a login form 630 (see FIG. 10) requesting the user's account name and password. The user inputs an account name and password into the login form 630 (see FIG. 10) and submits the login form. The wizard 174 receives the account name and password input by the user.

In block 522, the wizard 174 forwards the account name and password to the server computing device 7 and calls the AccountLogin Web Service (which executes on the server computing device 7).

In decision block 524, the AccountLogin Web Service determines whether the user has provided a valid account name and password. The decision in decision block 524 is "YES" when the user has provided a valid account name and password. Otherwise, the decision in decision block 524 is "NO" when the user has not provided a valid account name and password. In decision block 524, the AccountLogin Web Service validates the account name and password provided by the user against the information stored in AccountInfo table 430 (see FIG. 7) in the Account Database 13 (see FIG. 7). The following pseudo code provides a non-limiting example of an implementation of the AccountLogin Web Service.

---
AccountLogin (AccountName, Password)
---
SELECT * FROM dbo.AccountInfo
    WHERE dbo.AccountInfo.AccountName = AccountName
    AND dbo.AccountInfo.Password = Password
Return true if AccountName and Password are found, otherwise return false

---

As is apparent to those of ordinary skill in the art, the above pseudo code receives two input parameters, namely "AccountName" and "Password." The parameter "AccountName" stores the account name provided by the user and the parameter "Password" stores the password provided by the user. The pseudo code may be implemented at least in part as a SQL query that queries the AccountInfo table 430 for the values stored by the input parameters "AccountName" and "Password." If the query returns a result, the AccountInfo table 430 includes a record in which the value in the AccountName field is equal to the account name provided by the user and the value in the Password field is equal to password provided by the user. When the AccountInfo table 430 includes such a record, the login is successful and the decision in decision block 524 is "YES." The AccountLogin Web Service informs the wizard 174 as to whether the user has provided a valid account name and password.

When the decision in decision block 524 is "YES," the wizard 174 advances to block 518. Otherwise, if the query returns an empty set, the AccountInfo table 430 does not include a record storing the values stored by the parameters "AccountName" and "Password," and the decision in decision block 524 is "NO." When the decision in decision block 524 is "NO," the wizard 174 returns to block 510 or alternatively, to block 520.

In block 518, the wizard 174 generates and displays an application creation form 640 illustrated in FIG. 10. To generate the application creation form 640 (see FIG. 10), the wizard 174 calls the GetApplications Web Service (which executes on the server computing device 7) to download information related to existing virtual applications associated with the user. This information includes application names and versions. Optionally, the information may also include information related to layers (i.e., revisions or modifications made to a particular version). The information is grouped by application name and application version and may be used to populate dropdown boxes "B1" and "B2" on the application creation form 640 illustrated in FIG. 10. The dropdown box "B1" may display a list of applications. After an application is selected, the dropdown box "B2" may display a list of versions associated with the application selected. The dropdown box "B1" may include a "New Application" selection that may be selected to indicate the user wishes to upload a new application. Similarly, the dropdown box "B2" may include a "New Version" selection that may be selected to indicate the user wishes to upload a new version of the application selected or a new application.

The following pseudo code provides a non-limiting example of an implementation of the GetApplications Web Service.

```
GetApplications (AccountName, Password,
        out PublisherApplications)

SELECT AccountId FROM dbo.AccountInfo
    WHERE dbo.AccountInfo.AccountName = AccountName
    AND dbo.AccountInfo.Password = Password
    SELECT PublisherId FROM dbo.Publisher
    WHERE dbo.Publisher.AccountId = AccountId
    FOREACH ApplicationId FROM dbo.Application
    WHERE dbo.Application.PublisherId = PublisherId
        SELECT * from dbo.ApplicationVersion
        WHERE dbo.ApplicationVersion.AppId = ApplicationId
    Construct the output array of publisher application objects
    from the results of the Application table query and the
    ApplicationVersion table query. One for each application
    version.
```

As is apparent to those of ordinary skill in the art, the above pseudo code receives two input parameters, namely "AccountName" and "Password," and returns an array of publisher application objects stored in or referenced by an output parameter named "PublisherApplications." The pseudo code may be implemented at least in part as a SQL query that queries the AccountInfo table 430 (see FIG. 7) for the values of the parameters "AccountName" and "Password" to obtain the AccountID value associated with the login information. The pseudo code then queries (via a SQL query) the Publisher table 432 (see FIG. 7) using the AccountID value to obtain the PublisherID value associated with the AccountID value. Next, the pseudo code queries (via a SQL query) the Application table 434 (see FIG. 7) for any ApplicationID values associated with the PublisherID value. The pseudo code also queries (via a SQL query) the Application Version table 436 (see FIG. 7) for information associated with each of the ApplicationID values located.

Thus, the GetApplications Web Service obtains information for each version of each application associated with the login information provided by the user. The GetApplications Web Service uses this information to construct the array of application objects stored in (or referenced by) the output parameter "PublisherApplications." In particular embodiments, the GetApplications Web Service returns an application object for each version of each application. Each of the application objects has a Name member that stores the Name value obtained from the Name field in the Application table 434 (see FIG. 7) and a Version member that stores the Version value obtained from the Version field in the Application Version table 436 (see FIG. 7).

The application creation form 640 illustrated in FIG. 10 may be characterized as presenting the following three choices to the user:
1.) create a new application;
2.) create a new version of an existing application; and
3.) update an existing version of an existing application.

After selecting one of these choices, the user enters information into the application creation form 640.

Figure 6:
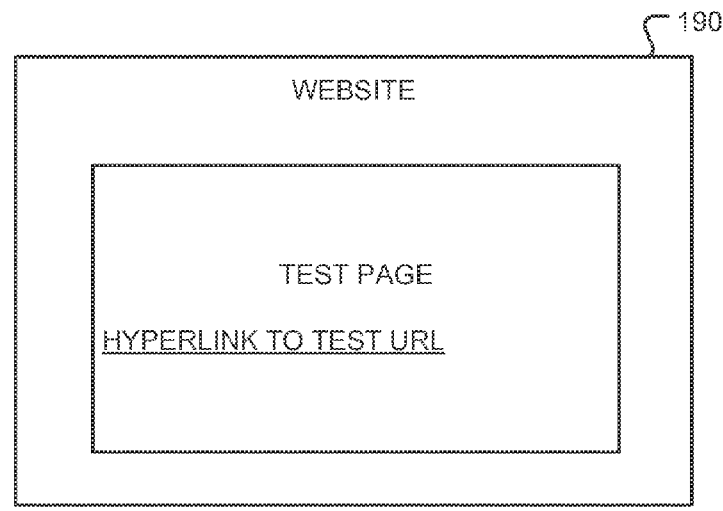
FIG. 6 is a block diagram of the website generated by the second server computing device of FIG. 4.

If the user selects "create a new application," the information entered is associated with the new application to be uploaded to the website 190 illustrated in FIG. 6. Thus, the user enters information required to populate a new record in the Application table 434 (see FIG. 7). Optionally, the user may also enter information required to populate a new record in the Application Version table 436 (see FIG. 7), and a new record in the Layer Version table 438 (see FIG. 7).

If the user selects "create a new version of an existing application," the information entered is associated with the version of an existing application to be uploaded to the website 190 illustrated in FIG. 6. Thus, the user selects an existing application (e.g., from the pre-populated dropdown box "B1" on the application creation form 640 illustrated in FIG. 10) and enters information required to populate a new record in the Application Version table 438 (see FIG. 7). Optionally, the user may also enter information required to populate a new record in the Layer Version table 438 (see FIG. 7).

By way of a non-limiting example, if the user selects either "create a new application" or "create a new version of an existing application," the user may input the following information: a web address at which the application is to be published (e.g., a value to be stored in the Domain field of the Domain table 433); summary information related to the application (e.g., a value to be stored in the Summary field of the Application table 434); a description of the application (e.g., a value to be stored in the Description field of the Application table 434); comments regarding the revision (a value to be stored in the InternalNotes field of the Layer Version table 438); a product URL (e.g., a value to be stored in the ProductWebsite field of the Application table 434); a screenshot captured from the application (or other image related to the application); and the like.

The screenshot (or other image) file is uploaded to the server computing device 7. When the screenshot file is uploaded, a record is created in the XFile table 439 for the screenshot file. The record in the XFile table 439 can be resolved to a physical file location so that the server computing device 7 may locate and display the screenshot file. The record in the XFile table 439 can be resolved to a physical file location by including a File field (not shown) in the XFile table 439 that stores a path to the screenshot file, generating a path to the screenshot file using the name of the application (e.g., "C:\web\www\images\[appname].png"), and the like.

On the other hand, if the user selects "update an existing version of an existing application," the user selects an existing application and version of that application (e.g., from pre-populated dropdown boxes "B1" and "B2" on the application creation form 640 illustrated in FIG. 10) and enters information required to populate a new record in the Layer Version table 438 (see FIG. 7). Further, the user may wish to enter comments (e.g., a value to be stored in the Internal Notes field of the Layer Version table 438) regarding the revision that are unique for each revision uploaded to the website 190 illustrated in FIG. 6.

When the user has finished entering information into the application creation form 640 (see FIG. 10), the user submits the form.

Returning to FIGS. 8 and 9, in block 526, the wizard 174 receives the information submitted by the user.

As explained above, the file to be published may be a binary file that may be implemented as an xlayer file (e.g., the xlayer file 300), an executable virtualized application file (e.g., the executable virtualized application file 140), and the like. The file to be published may be created before the method 500 is performed. Alternatively, in optional block 528, the user builds or rebuilds the file to be published using the authoring tool 170 and the application configuration 171 (see FIG. 2). By way of another non-limiting example, the file to be published may be built or rebuilt at another point during the execution of the method 500 occurring before the file to be published is uploaded to the server computing device 7. As explained above, the file to be published may be (a) a new application, version, and layer (or revision), (b) a new version and layer of an existing application, or (c) a new layer of an existing version of an existing application. Optionally, all or a portion of the information submitted by the user in the application creation form 640 may be incorporated into the newly built virtualized application file by the authoring tool 170.

If a new application is being added to the Application Library Database 14, a new ApplicationID value must be created. Similarly, if a new version of an existing application is being added to the Application Library Database 14, a new ApplicationVersionID value must be created. In block 530, the wizard 174 forwards the information received in block 526 to the server computing device 7 and calls the CreateApplication Web Service, which updates the Application Library Database 14 with the information related to the file to be published. If a new application is being added to the Application Library Database 14, the CreateApplication Web Service creates a record in the Application table 434 (see FIG. 7) for the file to be published and returns a new ApplicationID value created for the new record to the wizard 174. In block 532, the wizard 174 receives the new ApplicationID value from the CreateApplication Web Service. The following pseudo code provides a non-limiting example of an implementation of the CreateApplication Web Service.

```
CreateApplication (AccountName, Password,
    PublisherApplication, out InternalName)

SELECT AccountId FROM dbo.AccountInfo
    WHERE dbo.AccountInfo.AccountName = AccountName
    AND dbo.AccountInfo.Password = Password
    SELECT PublisherId FROM dbo.Publisher
    WHERE dbo.Publisher.AccountId = AccountId
If no publisher account exists, create the publisher account
from the data in the AccountInfo table.
    SELECT ApplicationId, InternalName FROM dbo.Application
    WHERE dbo.Application.Name = PublisherApplication.Name
If no application exists, create it from the data in the
PublisherApplication object. Generate a new unique
InternalName from the publisher name, application name, and
application version.
    SELECT * FROM dbo.ApplicationVersion
    WHERE dbo.ApplicationVersion.ApplicationId =
        ApplicationId
    AND dbo.ApplicationVersion.Version =
        PublisherApplication.Version
If no application version exists, create it from the data in
the PublisherApplication object.
Return the InternalName for the new or existing application.
```

As is apparent to those of ordinary skill in the art, the above pseudo code receives three input parameters, namely "AccountName," "Password," and "PublisherApplication," and returns an InternalName value stored in an output parameter named "InternalName." If the user selected an existing application on the application creation form 640 illustrated in FIG. 10, the parameter "PublisherApplication" may store one of the application objects of the array of applications objects "PublisherApplications" returned by the GetApplications Web Service. On the other hand, if the user selected "create a new application" on the application creation form 640 (see FIG. 10), the CreateApplication Web Service creates a new application object using the information provided on the application creation form.

The pseudo code may be implemented at least in part as a SQL query that queries the AccountInfo table 430 (see FIG. 7) for the values stored in the parameters "AccountName" and "Password" to obtain the AccountID value stored in the AccountID field of a record associated with the login information.

Then, the pseudo code queries (e.g., via SQL) the Publisher table 432 (see FIG. 7) using the AccountID value. If the query returns a result, the Publisher table 432 (see FIG. 7) includes a record having the AccountID value and the pseudo code obtains the PublisherID value associated with the AccountID value. Otherwise, if the query returns an empty set, the Publisher table 432 (see FIG. 7) does not include a record having the AccountID value and a new record is created in the Publisher table 432 (thereby creating a new publisher account) using the information in the AccountInfo table 430 (see FIG. 7). Thus, at this point, the pseudo code has the AccountID and PublisherID values associated with the account name and password provided by the user.

Next, the pseudo code queries (e.g., via SQL) the Application table 434 (see FIG. 7) for the value of the Name member of the application object "PublisherApplication." If the query returns a result, the Application table 434 includes a record having a Name value in the Name field equal to the value of the Name member of the application object "PublisherApplication" and the query obtains the ApplicationID and InternalName values stored in the record. The ApplicationID and InternalName values obtained are associated with the value of the Name member of the application object "PublisherApplication." Otherwise, if the query returns an empty set, the Application table 434 (see FIG. 7) does not include a record having a Name value in the Name field equal to the value of the Name member of the application object "PublisherApplication" and a new record is created in the Application table 434 (thereby creating a new application) using the information stored in the application object "PublisherApplication." A new unique InternalName value is generated based on the publisher name, application name, and application version. Thus, at this point, the pseudo code has obtained the ApplicationID and InternalName values associated with the application object "PublisherApplication."

Next, the pseudo code queries the Application Version table 436 (see FIG. 7) for the ApplicationID value associated with the application object "PublisherApplication" and the value of the Version member of the application object "PublisherApplication." If the query returns a result, the Application Version table 436 includes a record having an ApplicationID value (stored in the ApplicationID field) equal to the ApplicationID value associated with the application object "PublisherApplication" and a Version value (stored in the Version field) equal to the value of the Version member of the application object "PublisherApplication." When the query returns a result, the result includes the values of all the fields in the Application Version table 436 of the record located. Otherwise, if the query returns an empty set, the Application Version table 436 does not include a record having the having an ApplicationID value (stored in the ApplicationID field) equal to the ApplicationID value associated with the application object "PublisherApplication" and/or a Version value (stored in the Version field) equal to the value of the Version member of the application object "PublisherApplication." When this is the case, a new record is created in the Application Version table 436 (thereby creating a new version of the application) using the information in the application object "PublisherApplication."

The CreateApplication Web Service returns the InternalName value associated with the Name member of the application object "PublisherApplication."

In block 534, the wizard 174 calls the StartUploadData Web Service to initiate the upload. The following pseudo code provides a non-limiting example of an implementation of the StartUploadData Web Service.

```
StartUploadData (AccountName, Password,
        InternalName, out Guid)

SELECT * FROM dbo.AccountInfo
    WHERE dbo.AccountInfo.AccountName = AccountName
    AND dbo.AccountInfo.Password = Password
    Create a new Guid and create an empty file with the name
    Guid.xlayer in the upload file folder.
    Return the new Guid.
```

As is apparent to those of ordinary skill in the art, the above pseudo code receives three input parameters, namely "AccountName," "Password," and "InternalName," and returns a globally unique identifier stored in an output parameter named "Guid." The pseudo code may be implemented at least in part as a SQL query that queries the AccountInfo table 430 (see FIG. 7) for the values of the parameters "AccountName" and "Password" to obtain the values of the fields of the record in the AccountInfo table 430 associated with the login information. While not included in the pseudo code above, this query may be used to prevent unauthorized or non-existent users from publishing applications and/or adding or modifying data stored in the Account Database 13 or the Application Library Database 14. For example, if this query does not return a record, the StartUploadData Web Service may terminate.

Then, the pseudo code creates a new globally unique identifier "Guid" and an empty file. The empty file is stored in a predetermined upload file location (e.g., a folder). The empty file may be an xlayer file named in accordance with a predetermined format using the globally unique identifier stored in the parameter "Guid." By way of a non-limiting example, the predetermined format may be as follows: "Guid.xlayer." Then, the parameter "Guid" is returned by the StartUploadData Web Service to the wizard 174.

In block 536, the wizard 174 calls the UploadData Web Service to upload the file to be published in chunks or blocks (e.g., one megabyte blocks) to the server computing device 7. The following pseudo code provides a non-limiting example of an implementation of the UploadData Web Service. The UploadData Web Service may be called multiple times, once for each block.

```
UploadData(AccountName, Password, BinaryData, Guid)

SELECT * FROM dbo.AccountInfo
    WHERE dbo.AccountInfo.AccountName = AccountName
    AND dbo.AccountInfo.Password = Password
    Append the binary data to the file with the name Guid.xlayer
    in the upload file folder.
```

As is apparent to those of ordinary skill in the art, the above pseudo code receives four input parameters, namely "AccountName," "Password," "BinaryData," and "Guid." The pseudo code may be implemented at least in part as a SQL query that queries the AccountInfo table 430 for the values of the parameters "AccountName" and "Password" to obtain the values of the fields of the record in the AccountInfo table 430 associated with the login information. While not included in the pseudo code above, this query may be used to prevent unauthorized or non-existent users from publishing applications and/or adding or modifying data stored in the Account Database 13 or the Application Library Database 14. For example, if this query does not return a record, the Upload Data Web Service may terminate. As is apparent to those of ordinary skill in the art, it may not be necessary to perform this query for each separate block of data. In alternate implementations, this query may be executed once (e.g., when the first block is uploaded).

Then, the pseudo code inserts or appends binary data stored in the input parameter "BinaryData" to the file created by the StartUploadData Web Service. The name of this file may be determined based at least in part on the value of the parameter "Guid." Thus, in particular implementations, the pseudo code appends binary data stored in the input parameter "BinaryData" to a file having a name with the format "Guid.xlayer" stored in the upload file location.

At this point, the Upload Data Web Service may indicate in the Application Library Database 14 (see FIG. 7) that the file to be published has been fully uploaded. This may be indicated by entering a new record in the Layer Version table 438.

While the information entered by the user into the application creation form 640 illustrated in FIG. 10 has been described as being sent to the server computing device 7 for entry into the Application Library Database 14. The information entered by the user into the application creation form 640 need not be sent to the server computing device 7 in addition to uploading the file to be published. Instead, because the file to be published is built on the client computing device 9, the information entered by the user may be incorporated into the file to be published before it is uploaded to the server computing device 7. Thus, the server computing device 7 may read or parse the uploaded file 192 (see FIG. 3) for the data to be entered into the Application Library Database 14. For example, the xlayer file 300 may include publisher information, application information, and version information. Thus, when the uploaded file 192 is an xlayer file, at least a portion of the information used to populate the Application table 434, Application Version table 436, and the Layer Version table 438 may be obtained from the uploaded file 192. However, as is apparent to those of ordinary skill in the art, all of the information entered into the application creation form 640 (see FIG. 10) may be incorporated into the file to be uploaded.

As explained above, the version information may have four components: a major version; a minor version; a build version; and a revision number. Each record in the Layer Version table 438 may correspond to a different build version and revision number. Thus, each record in the Layer Version table 438 may correspond to a different patch.

After the file to be published has been fully uploaded to the server computing device 7, the uploaded file 192 (see FIG. 3) is transferred or copied to the server computing device 6 (which functions as a website server). In block 540, the wizard 174 calls the CompleteUpload Web Service to begin copying the file to the server computing device 6. The following pseudo code provides a non-limiting example of an implementation of the CompleteUpload Web Service.

```
CompleteUpload (AccountName, Password, InternalName,
        RevisionNotes, FileHash, Guid, out LayerVersionId)

SELECT * FROM dbo.AccountInfo
    WHERE dbo.AccountInfo.AccountName = AccountName
    AND dbo.AccountInfo.Password = Password
    SELECT *, ApplicationId FROM dbo.Application
    WHERE dbo.Application.InternalName = InternalName
    SELECT TOP 1 *,ApplicationVersionId
    FROM dbo.ApplicationVersion
    WHERE dbo.ApplicationVersion.ApplicationId =
        ApplicationId
    ORDER BY Version DESC
```

```
SELECT TOP 1 RevisionNumber FROM dbo.LayerVersion
    WHERE dbo.LayerVersion.ApplicationVersionId =
        ApplicationVersionId
    ORDER BY Revision DESC
Create new layer version from data with incremented
RevisionNumber, or number 1 if there were no previous layer
versions.
Kick off a separate thread to copy the xlayer file to from
the upload server to the public website server, and return
the LayerVersionId.
                        Separate Thread Open a global mutex for this LayerVersionId
Copy the .xlayer file across a LAN from the upload folder on
the App Library WebServer to the Public Website Web Server.
Close the global mutex for this LayerVersionId.
```

As is apparent to those of ordinary skill in the art, the above pseudo code receives six input parameters, namely "AccountName," "Password," "InternalName," "RevisionNotes," "FileHash," and "Guid," and returns a LayerVersionID value stored in an output parameter named "LayerVersionID." The pseudo code may be implemented at least in part as a SQL query that queries the AccountInfo table 430 (see FIG. 7) for the values of the parameters "AccountName" and "Password" to obtain the values of the fields of the record in the AccountInfo table 430 associated with the login information. While not included in the pseudo code above, this query may be used to prevent unauthorized or non-existent users from publishing applications and/or adding or modifying data stored in the Account Database 13 or the Application Library Database 14. For example, if this query does not return a record, the CompleteUpload Web Service may terminate.

Next, the pseudo code queries the Application table 434 (see FIG. 7) for a record having the value of the input parameter "InternalName" stored in the InternalName field to obtain the ApplicationID value of the record associated with the InternalName value stored in the input parameter "InternalName." Then, the pseudo code queries the Application Version table 436 (see FIG. 7), using the ApplicationID value, for the record created for the latest version (of the application) associated with the ApplicationID value to obtain the ApplicationVersionID value associated with the latest version (of the application). Next, the pseudo code queries the Layer Version table 438 (see FIG. 7) using the ApplicationVersionID value, for the record created for the latest layer (of the latest version of the application) associated with the ApplicationID value to obtain the RevisionNumber value, if any, associated with the latest layer (of the latest version of the application).

The pseudo code then creates a new record in the Layer Version table 438 (see FIG. 7) for the new layer version. The RevisionNumber value of the new record is determined by incrementing the RevisionNumber value obtained above or alternatively, if no value was returned, assigning an initial value (e.g., one) to the RevisionNumber value.

In the pseudo code above, a separate thread is launched to copy the uploaded file 192 (see FIG. 3) from the server computing device 7 (which functions as an upload server) to the server computing device 6 (which functions as a website server). Referring to FIG. 1, the separate thread opens a global mutex (or a mutual exclusion) for the new LayerVersionID value, copies the uploaded file 192 (see FIG. 3) across the network 10 (e.g., a LAN portion of the network 10) from the upload file location on the server computing device 7 to the server computing device 6, and closes the global mutex for the new LayerVersionID value. Then, the CompleteUpload Web Service returns the LayerVersionID value to the wizard 174.

Returning to FIGS. 8 and 9, in block 548, the wizard 174 calls the IsAppReadyForTesting Web Service to determine whether the copying of the uploaded file (started in block 540) to the server computing device 6 has completed. If it has, the wizard 174 receives an application address from the IsAppReadyForTesting Web Service. The application address may be an address on the domain entered into the application creation form 640 (see FIG. 10) and/or stored in the Domain field of the Domain table 433 (see FIG. 7).

In decision block 550, the wizard 174 determines whether the copying of the uploaded file to the server computing device 6 (which functions as a website server) has completed. The decision in decision block 550 is "YES" when the copying of the uploaded file to the server computing device 6 has completed. Otherwise, the decision in decision block 550 is "NO" when the copying of the uploaded file to the server computing device 6 has not yet completed. When the decision in decision block 550 is "NO," the wizard 174 returns to block 548.

When the decision in decision block 550 is "YES," in block 558, the wizard 174 obtained the application address (e.g., an application URL) on the server computing device 6 from which the copy of the uploaded file 196 (see FIG. 4) may be downloaded and executed for test or other purposes.

The wizard 174 may occasionally (e.g., periodically) call the IsAppReadyForTesting Web Service to confirm that the copy of the uploaded file is available on the server computing device 6, which may function as a test server. The following pseudo code provides a non-limiting example of an implementation of the IsAppReadyForTesting Web Service.

```
IsAppReadyForTesting (AccountName, Password,
        LayerVersionId, out Ready, out TestUrl)

SELECT * FROM dbo.AccountInfo
        WHERE dbo.AccountInfo.AccountName = AccountName
        AND dbo.AccountInfo.Password = Password
    If the global mutex for the LayerVersionId still exists.
    Then set Ready to FALSE and return.
    Else set Ready to TRUE.
        SELECT TestLinkUrl FROM dbo.LayerVersion
            WHERE dbo.LayerVersion.Id = LayerVersionId
    Set TestUrl to TestLinkUrl and return.
```

As is apparent to those of ordinary skill in the art, the above pseudo code receives three input parameters, namely "AccountName," "Password," and "LayerVersionID," and returns two output parameters named "Ready" and "TestURL." The pseudo code may be implemented at least in part as a SQL query that queries the AccountInfo table 430 (see FIG. 7) for the values of the parameters "AccountName" and "Password" to obtain the values of the fields of the record in the AccountInfo table 430 associated with the login information. While not included in the pseudo code above, this query may be used to prevent unauthorized or non-existent users from publishing applications and/or adding or modifying data stored in the Account Database 13 or the Application Library Database 14. For example, if this query does not return a record, the IsAppReadyForTesting Web Service may terminate.

Then, the pseudo code determines whether the global mutex created for the LayerVersionID value in the example of the CompleteUpload Web Service described above still exists. If the global mutex created for the LayerVersionID value still exists, the uploaded file 192 (see FIG. 3) is still being copied to the server computing device 6 and the value of the output parameter "Ready" is set to "FALSE." Otherwise, if the global mutex created for the LayerVersionID value no longer exists, the copying of the uploaded file 192 (see FIG. 3) to the server computing device 6 has completed and the value of the output parameter "Ready" is set to "TRUE."

Next, the pseudo code queries the Layer Version table 438 for the LayerVersionID value to obtain the TestLinkUrl value from the record associated with the LayerVersionID value. The value of the output parameter "TestURL" is set to the TestLinkUrl value obtained and the output parameter "TestURL" is returned to the wizard 174.

In block 558, the wizard 174 displays a test form 650 (see FIG. 10) with a link to the application address (i.e., the value of the output parameter "TestURL") provided by the IsAppReadyForTesting Web Service. The user may select the application address to download and/or execute the application for testing or other purposes. Then, the method 500 terminates.

Optionally, the application address may be forwarded to other users who may download and/or execute the copy of the uploaded file 196 (see FIG. 4) for testing or other purposes.

The server computing device 6 may generate an application web page on the website 190 illustrated in FIG. 6. The application webpage may display a link to the application address (e.g., as a hyperlink) that the user may select to download and/or execute the copy of the uploaded file. Referring to FIG. 5, as explained above, if the link includes a parameter value (e.g., a flag) indicating that the application is to be provided, the Sandbox Manager 134 (see FIG. 5) instructs the virtual runtime engine 131 to operate in profile mode and collects profile information (supplied by the virtual runtime engine 131) and stores it in one or more transcripts that may be used to profile a virtual application's access to the underlying original application file (e.g., the xlayer file 300).

The Application Library Database 14 may be queried for application information that may be used to generate web pages on the website 190. For example, the Application Library Database 14 may be queried for a list of applications associated with a particular publisher. Links to each application published by the publisher may be displayed to a user for selection thereby.

By publishing each patch to an application as a new record in the Layer Version table 438 (see FIG. 7) of the Application Library Database 14, a revision to an application may be published without disturbing users currently downloading or executing applications using pre-existing application addresses stored in preexisting records in the Layer Version table 438.

Computing Devices

Figure 11:
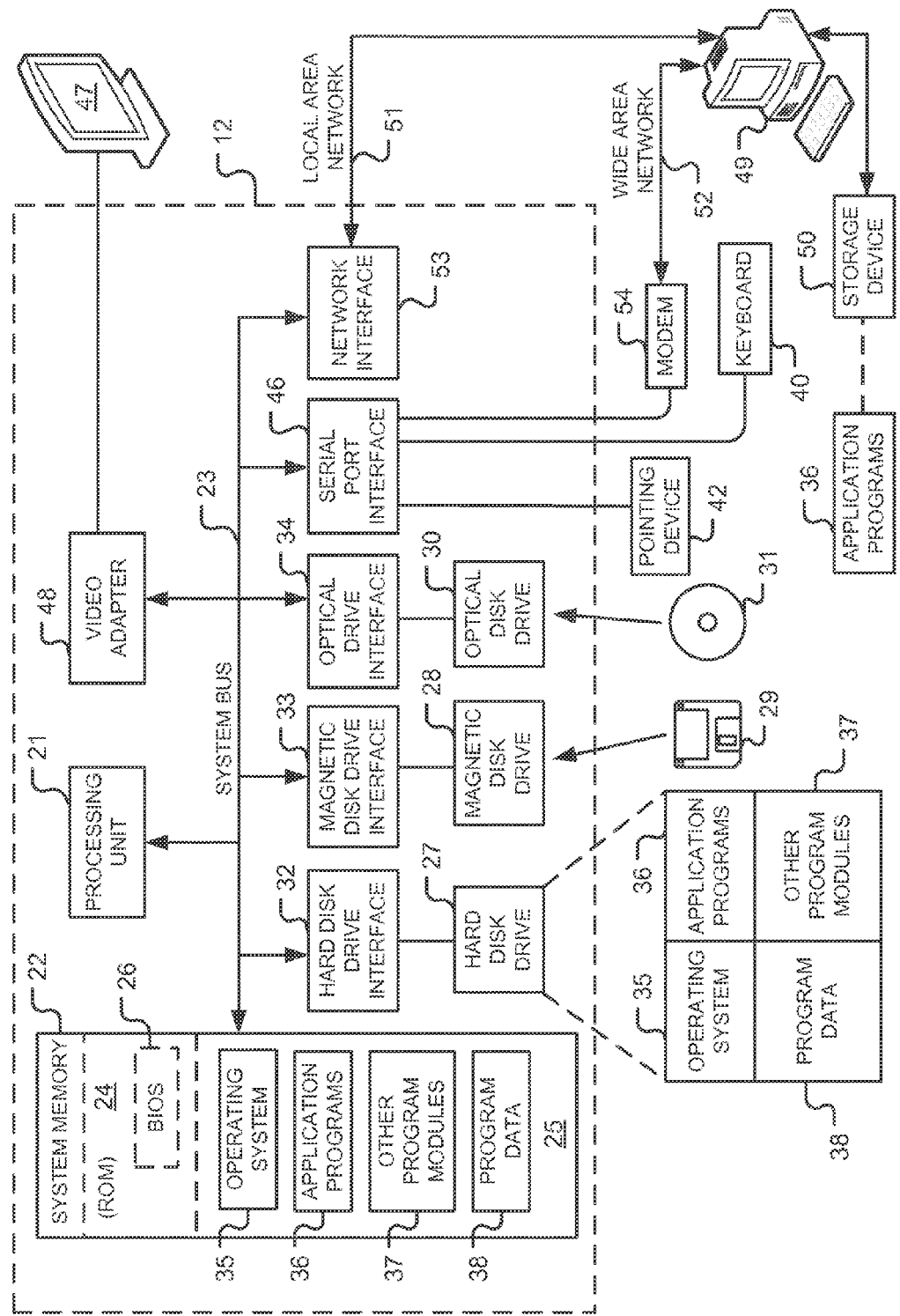
FIG. 11 is a diagram of a hardware environment and an operating environment in which one or more of the computing devices of the system of FIG. 1 may be implemented.

FIG. 11 is a diagram of hardware and an operating environment in conjunction with which implementations of the virtual application file 140, the xlayer file 300, the Client Application 132, the Sandbox Manager 134, the authoring tool 170 (including the wizard 174), the web server components 142A, the web server components 142B, the application library web services (implemented by the application library web services components 143 illustrated in FIG. 3), and/or the virtual runtime engine 131 may be practiced. The description of FIG. 11 is intended to provide a brief, general description of suitable computer hardware and a suitable computing environment in which implementations may be practiced. Although not required, implementations are described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that implementations may be practiced with other computer system configurations, including hand-held devices, multi-processor systems, microprocessor-based or programmable consumer electronics, network PCs, minicomputers, mainframe computers, and the like. Implementations may also be practiced in distributed computing environments where tasks are performed by remote processing devices that are linked through a communications network. In a distributed computing environment, program modules may be located in both local and remote memory storage devices.

The exemplary hardware and operating environment of FIG. 11 includes a general-purpose computing device in the form of a computing device 12. Each of the virtual application file 140, the xlayer file 300, the Client Application 132, the Sandbox Manager 134, the authoring tool 170 (including the wizard 174), the web server components 142A, the web server components 142B, the application library web services (implemented by the application library web services components 143 illustrated in FIG. 3), and/or the virtual runtime engine 131 may be implemented using one or more computing devices like the computing device 12. By way of non-limiting example, the virtual application file 140, the xlayer file 300, the Client Application 132, the Sandbox Manager 134, the authoring tool 170 (including the wizard 174), the web server components 142A, the web server components 142B, the application library web services (implemented by the application library web services components 143 illustrated in FIG. 3), and/or the virtual runtime engine 131 may be implemented on the computing device 12. Further, each of the server computing device 6, the server computing device 7, the client computing device 9, the client computing device 11, the Account Database 13, and the Application Library Database 14 may be implemented by computing devices substantially similar to the computing device 12.

The computing device 12 includes the system memory 22, a processing unit 21, and a system bus 23 that operatively couples various system components, including the system memory 22, to the processing unit 21. There may be only one or there may be more than one processing unit 21, such that the processor of computing device 12 comprises a single central-processing unit (CPU), or a plurality of processing units, commonly referred to as a parallel processing environment. The computing device 12 may be a conventional computer, a distributed computer, or any other type of computer.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computing device 12, such as during start-up, is stored in ROM 24. The computing device 12 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM, DVD, or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules, and other data for the computing device 12. It should be appreciated by those skilled in the art that any type of computer-readable media which can store data that is accessible by a computer, such as magnetic cassettes, flash memory cards, USB drives, digital video disks, Bernoulli cartridges, random access memories (RAMs), read only memories (ROMs), and the like, may be used in the exemplary operating environment. As is apparent to those of ordinary skill in the art, the hard disk drive 27 and other forms of computer-readable media (e.g., the removable magnetic disk 29, the removable optical disk 31, flash memory cards, USB drives, and the like) accessible by the processing unit 21 may be considered components of the system memory 22.

A number of program modules may be stored on the hard disk drive 27, magnetic disk 29, optical disk 31, ROM 24, or RAM 25, including an operating system 35, one or more application programs 36, other program modules 37, and program data 38. A user may enter commands and information into the computing device 12 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus 23, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The input devices described above are operable to receive user input and selections. Referring to FIG. 10, the display device is operable to display the initial form 610, the new account form 620, the login form 630, the application creation form 640, and the test form 650. Further, the display device is operable to display web pages (e.g., web pages generated by the server computing device 6 illustrated in FIG. 1). Together the input and display devices may be described as providing a user interface.

Returning to FIG. 11, the computing device 12 may operate in a networked environment using logical connections to one or more remote computers, such as remote computer 49. These logical connections are achieved by a communication device coupled to or a part of the computing device 12 (as the local computer). Implementations are not limited to a particular type of communications device. The remote computer 49 may be another computer, a server, a router, a network PC, a client, a memory storage device, a peer device or other common network node, and typically includes many or all of the elements described above relative to the computing device 12. The remote computer 49 may be connected to a memory storage device 50. The logical connections depicted in FIG. 11 include a local-area network (LAN) 51 and a wide-area network (WAN) 52. Such networking environments are commonplace in offices, enterprise-wide computer networks, intranets and the Internet.

When used in a LAN-networking environment, the computing device 12 is connected to the local area network 51 through a network interface or adapter 53, which is one type of communications device. When used in a WAN-networking environment, the computing device 12 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computing device 12, or portions thereof, may be stored in the remote computer 49 and/or the remote memory storage device 50. It is appreciated that the network connections shown are exemplary and other means of and communications devices for establishing a communications link between the computers may be used.

The computing device 12 and related components have been presented herein by way of particular example and also by abstraction in order to facilitate a high-level view of the concepts disclosed. The actual technical design and implementation may vary based on particular implementation while maintaining the overall nature of the concepts disclosed.

Returning to FIGS. 2-5, the system memory 22A, the system memory 22B, the system memory 22C, and the system memory 22D may each be substantially similar to the system memory 22. Thus, the host operating system 35A, the host operating system 35B, the host operating system 35C, the host operating system 35D, the virtual application file 140, the xlayer file 300, the Client Application 132, the Sandbox Manager 134, the authoring tool 170 (including the wizard 174), the web server components 142A, the web server components 142B, the application library web services (implemented by the application library web services components 143 illustrated in FIG. 3), and/or the virtual runtime engine 131 may be stored as computer executable components on the system memory 22A, 22B, 22C, and/or 22D. Each of the host operating system 35A, the host operating system 35B, the host operating system 35C, the host operating system 35D, the virtual application file 140, the xlayer file 300, the Client Application 132, the Sandbox Manager 134, the authoring tool 170 (including the wizard 174), the web server components 142A, the web server components 142B, the application library web services (implemented by the application library web services components 143 illustrated in FIG. 3), and/or the virtual runtime engine 131 may be implemented using software components that are executable by the processing unit 21 and when executed perform the functions described above. Further, the method 500 may be implemented as computer executable instructions that are executable by the processing unit 21. Such instructions may be encoded on one or more non-transitory computer-readable mediums for execution by one or more processing units.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Accordingly, the invention is not limited except as by the appended claims.

The invention claimed is:

1. A computer-implemented method for use with a first server computing device and a second server computing device connected to the first server computing device over a network, the method comprising:
building, by an authoring tool executing on a client computing device, a virtualized version of a selected application, the virtualized version comprising an application file;
uploading, by the authoring tool, the application file to the first server computing device over the network;
instructing, by the authoring tool, the first server computing device to copy the application file to the second server computing device;
receiving, by the authoring tool, an application address from the first server computing device after the application file has been fully copied to the second server computing device, the application file being available on the second server computing device at the application address for download and execution over the network; and
displaying, by the authoring tool, a link to the application address to a user after the application file has been fully copied to the second server computing device, wherein the first server computing device parses the application file for parsed information, and stores the parsed information in an application library database, the parsed information comprising an application identifier identifying the selected application, and version information identifying a version associated with the selected application, the selected application being in a list of applications associated with a publisher, the list of applications having been assembled by the first server computing device.

2. The computer-implemented method of claim 1, wherein uploading the application file to the first server computing device further comprises:
successively uploading portions of the application file separately.

3. The computer-implemented method of claim 1, further comprising:
obtaining, by the authoring tool, the list of applications from the first server computing device;
displaying, by the authoring tool, the list of applications to a user, the selected application being a selected one of the list of applications displayed; and
receiving, by the authoring tool, the selection of the selected application before building the virtualized version of the selected application.

4. The computer-implemented method of claim 1, further comprising: forwarding the application address to a different user over the network.

5. The computer-implemented method of claim 4, further comprising: before forwarding the application address to the different user, modifying the application address to indicate that when the virtualized version of the selected application is executed, the execution of the virtualized version of the selected application is to be profiled.

6. The computer-implemented method of claim 1, further comprising: receiving application information from the user related to the selected application; and
incorporating the application information received into the application file when building the virtualized version of the selected application.

7. The computer-implemented method of claim 6, wherein the application information comprises an identifier associated with the publisher.

8. The computer-implemented method of claim 6, wherein the application information comprises an identifier of a domain whereat the virtualized version of the selected application is to be published.

9. The computer-implemented method of claim 8, wherein the application address is an address on the domain.

10. The computer-implemented method of claim 6, wherein the application information comprises the application identifier and the version information.

11. The computer-implemented method of claim 10, wherein the version information comprises a major version indicator, a minor version indicator, a build indicator, and a revision indicator.

12. The computer-implemented method of claim 1, wherein uploading the application file to the first server computing device further comprises:
uploading portions of the application file separately; and before uploading each portion, validating that the user is authorized to upload the application file.

13. The computer-implemented method of claim 12, wherein validating that the user is authorized to upload the application file further comprises:
receiving a user name and a password from the user; and
determining whether the user has entered a valid user name and password.

14. A system for use with a client computing device, the system comprising:
an application library;
an upload server computing device connected to the application library and the client computing device, the upload server computing device being configured to receive an application file uploaded by the client computing device, parse the uploaded application file to obtain information related to the application file, and store the information in the application library; and
a website server computing device connected to the upload server computing device, the upload server computing device being configured to receive an instruction from the client computing device to copy the application file to the website server computing device, copy the application file to the website server computing device at an application address in response to receiving the instruction, determine when the application file has been fully copied to the website server computing device, and forward the application address to the client computing device after the application file has been fully copied to the website server computing device.

15. The system of claim 14, wherein the upload server computing device is configured to query the application library for a list of applications associated with a publisher and forward the list to the client computing device before receiving the application file from the client computing device.

16. The system of claim 14, wherein the website server computing device is configured to generate a website with a link to the application address;
receive a request from a different client computing device to download the application file;
download the application file to the different client computing device; and
as the application file is downloading, receive a new version of the application file from the upload server computing device and store the new version of the application file without interrupting the downloading of the application file to the different client computing device.

17. The system of claim 14, wherein the application file is a binary file that at least partially implements a virtual application.

18. The system of claim 14, further comprising:
an account database storing account information, the upload server computing device being configured to query the account database to determine whether a user operating the client computing device is authorized to upload the application file.

19. The system of claim 14, wherein the website server computing device is configured to generate a website with a link to the application address.

20. The system of claim 14, wherein the website server computing device is further configured to query the application library and generate a web page displaying a result received in response to the query.

21. A computer-implemented method for use with a client computing device and a second server computing device, the method comprising:
receiving, at a first server computing device, an application file uploaded by the client computing device, the application file at least partially implementing a virtualized version of an application;
receiving, by the first server computing device, an instruction from the client computing device to copy the application file to the second server computing device;
in response to receiving the instruction, copying, by the first server computing device, the application file to the second server computing device;
after the application file has been fully copied to the second server computing device, forwarding, by the first server computing device, an application address to the client computing device, the application address being on the second server computing device, and the application file being available for download and execution over the Internet at the application address;
identifying, by the first server computing device, a plurality of applications associated with a publisher;
parsing, by the first server computing device, the application file for information comprising an application identifier identifying one of the plurality of applications, and version information identifying a version associated with the identified application; and
storing, by the first server computing device, the information parsed from the application file in an application library database.

22. The computer-implemented method of claim 21, wherein the version information comprises a major version indicator, a minor version indicator, a build indicator, and a revision indicator.

23. The computer-implemented method of claim 21, further comprising:
receiving, at the first server computing device, a request for a list of applications associated with the publisher from the client computing device; and
in response to the request, identifying, by the first server computing device, the plurality of applications associated with the publisher, assembling the list of applications associated with the publisher, and forwarding the list to the client computing device.

* * * * *